United States Patent [19]
Nelson

[11] Patent Number: 5,909,684
[45] Date of Patent: Jun. 1, 1999

[54] SYSTEM, METHOD, AND COMPUTER PROGRAM PRODUCT FOR CREATING A PLATFORM INDEPENDENT NOTEBOOK CONTROL

[75] Inventor: Douglas C. Nelson, Garner, N.C.

[73] Assignee: MCI Communications Corporation, Washington, D.C.

[21] Appl. No.: 08/987,933

[22] Filed: Dec. 10, 1997

[51] Int. Cl.[6] .................................................. G06F 15/163
[52] U.S. Cl. ............................... 707/103; 707/4; 707/10; 707/102; 707/513; 707/526; 395/200.31; 395/200.52; 395/682; 345/160; 345/333; 345/348
[58] Field of Search .................................... 707/4, 10, 102, 707/103, 513, 526; 395/200.31, 200.52, 682; 345/348, 160, 333

[56] References Cited

U.S. PATENT DOCUMENTS

| | | | |
|---|---|---|---|
| 5,550,563 | 8/1996 | Matheny et al. | 345/168 |
| 5,680,619 | 10/1997 | Gudmundson et al. | 707/1 |
| 5,757,925 | 5/1998 | Faybishenko | 380/49 |
| 5,801,689 | 9/1998 | Huntsman | 345/329 |
| 5,802,530 | 9/1998 | Van Hoff | 707/513 |
| 5,838,322 | 11/1998 | Nakajima et al. | 345/348 |

OTHER PUBLICATIONS

Buss, et al., "Discrete event simulation on the world wide web using Java", Winter Simulation Conference Proceedings, abstract only, 1996.

Nigam, et al., "Platform independent tool for designing quality graphical user interfaces", Proeedings of Basque International Workshop on Information Technology, IEEE, abstract only, Jul. 1997.

Naps, Thomas "Algorithm visualization on the World Wide Web—the difference that Java makes", Proceedings on Integrating Technology into Computer Science Education, Abstract only, Jun. 1997.

*Primary Examiner*—Paul V. Kulik
*Assistant Examiner*—Jean R. Homere

[57] ABSTRACT

A system, method, and computer program product for enabling a programmer to create an application program with an object-oriented notebook control is described. Platform independent, object-oriented notebook and notebookPage classes comprised of a plurality of methods and variables are detailed from which a notebook control object is constructed and manipulated to represent the paradigm of a notebook. The notebook control object receives data from mouse and keyboard events and organizes it into a dual dimensional vector including folders and pages. An improved method of mouse selection of components is depicted. An improved method of drawing involving off-screen graphic images is summarized.

35 Claims, 26 Drawing Sheets

SYSTEM, METHOD, AND COMPUTER PROGRAM PRODUCT FOR CREATING A PLATFORM INDEPENDENT NOTEBOOK CONTROL

BACKGROUND OF THE INVENTION

1. Field of the Invention

The present invention relates to object-oriented programming. More particularly, this invention relates to an object-oriented notebook control object. Even more particularly, this invention relates to a platform independent object for enabling faster application development in a Java environment.

2. Related Art

Most modern computer application programs and operating system programs (hereafter collectively referred to as "Programs") employ graphical user interfaces (hereafter "GUIs") in order to simplify end user interaction. GUIs add "user-friendly" features to Programs. GUIs often use graphical symbols familiar to the end user. Some popular GUI features are icons, windows, dialogue boxes and buttons. GUI features increase end user productivity by decreasing end user learning curves and training requirements.

Modern Programs with GUIs are functionally limited in at least the following ways. Modern Programs do not provide for distributed access to centralized Programs from remote locations without using complex networking hardware and software. Also, modern Programs are not platform independent. Modern Programs do not support a client/server environment for real-time updates to applications without using platform dependent command scripts. Furthermore, modern Programs do not provide a consistent look and feel across multiple platforms. Modern Programs do not support simple centralized automatic software distribution of Program updates.

The Internet promises to facilitate improved end user interaction with distributed applications in a client-server environment. Modern World Wide Web (WWW) Internet browsers permit graphical access to remote internet homepages written in Hyper Text Markup Language (HTML). HTML homepages may invoke Java applications and embedded applets.

Java is an objected oriented programming (OOP) language. Java "classes" are typically embedded in the HTML code of an Internet homepage. Java programming language compatibility has been incorporated into many WWW browsers. Several operating systems allow native execution of Java applications when not connected to the Internet. Java compatibility enables a Java "Applet" to be embedded in a homepage. Java compatibility also allows a Java "Application" to execute as a separate application on a client computer. Java compatible browsers and native run-time environments are well known in the industry.

The fundamental mechanisms that enforce the Java OOP model are known as encapsulation, inheritance and polymorphism.

Encapsulation may be thought of as placing a wrapper around the code and data of a program. In Java the basis of encapsulation is a class. An object is a single instance of a class. A class describes general attributes of that object. A class includes a set of data attributes plus a set of allowable operations (that is, methods). The individual structure or data representation of a class is defined by a set of instance variables.

Inheritance is another feature of Java. A class (called a subclass) may be derived from another class (called a superclass) wherein the subclass inherits the data attributes and methods of the super class. The subclass may specialize the super class by adding code which overrides the data and/or methods of the super class, or which adds new data attributes and methods. Thus, inheritance represents a mechanism by which subclasses are more precisely specified. A new subclass includes all the behavior and specification of all of its ancestors. Inheritance is a major contributor to the increased programmer efficiency provided by OOP and Java. Inheritance makes it possible for developers to minimize the amount of new code they have to write to create applications. By providing a significant portion of the functionality needed for a particular task, classes in the inheritance hierarchy give the programmer a head start to program design and creation.

Polymorphism, meaning one object, many shapes, allows a method to have multiple implementations selected based on which type of object is passed into the method invocation. Methods are passed information as parameters to the method invocation. Parameters represent the input values to a function that the method must perform. The parameters are a list of "typed" values which comprise the input data to a particular message. Java requires that the types of the values be exactly matched in order for the message to be understood.

Application development classes available to the Java application developer today are functionally limited in at least the following ways. No provision is made in modern Java application development kits for a notebook control GUI object. Modern Java development kits are limited in functionality and require the Java programmer to independently write extensive program flow coordination code in order to write a program. This reduces programmer productivity by requiring burdensome duplicative effort.

Thus, what is needed is a platform independent object oriented notebook control program.

SUMMARY OF THE INVENTION

A method, system, and computer program product are provided that enables a programmer to write a notebook control program. The system and method enable a programmer to create a platform independent object-oriented notebook control application in a computer having a memory component. The method, system, and computer program product include several steps. One step involves a programmer invoking a program instantiating a notebook control object. Another step adds a folder to the notebook control object. In yet another step, a notebook page is added to the folder. In an additional step, a tabStop data field is added to the notebook page. Another step initializes the data of the notebook control object. A step paints the notebook control object. Another step sets the focus to a tabStop data field element. An additional step of the notebook control waits to process user events.

In an embodiment of the invention, the step of instantiating the notebook control includes additional tasks. One task constructs the notebook control object. Another task sets tabSize of the notebook control object. An additional task sets the direction of the notebook control object. A task sets up constraints of the notebook control object. Also, a task sets up the layout of the notebook control object according to the direction selected by the programmer.

In another embodiment of the invention, the step of adding a folder includes adding a notebookPage object.

In another embodiment, the step of adding a notebookPage includes several tasks. One task performed adds a new vector element to a folder if the size of a folder equals the numberOf Pages. Another task adds a newPage object by tabName to the page. An additional task saves information about newPage for later use. Another task increments a counter of the numberOfPages.

In an additional embodiment of the present invention, the step of adding a tabStop data field includes adding an element to a tab-keySelection vector The method and system of another embodiment can further include a step adding an additional tabStop data field to the notebookPage.

An embodiment of the method and system can also further include a step adding an additional notebookPage to the folder.

Another embodiment of the method and system can additionally include a step of adding an additional folder to the notebook control object performing several tasks. One task adds a new vector element to folders until the size of the folders( ) vector is less than folderNumber. Another task adds a newPage object by tabName. An additional task saves information about the newPage for later use.

In another embodiment, the step of initializing data of the notebook includes initializing data of a horizontal or a vertical notebook. The step of initializing data of the notebook includes several tasks. One task calculates the number of possible tabs. Another task checks if the currentTab has moved offscreen. An additional task reloads and adds invisible tabSelection rectangles for using the mouse to select a folder. Another task reloads and adds invisible arrowSelection rectangles for scrolling to offscreen folders if not all folders are displayed. This is accomplished by providing left and right arrows for a horizontal notebook and by providing up and down arrows for a vertical notebook. An additional task reloads and adds invisible page selection arrows if more than one page exists in the folder. These can include adding a left pointing arrow for advancing to an additional page, and adding a right pointing arrow for moving to a previous page.

In another embodiment of the present invention the step of painting the notebook control includes the steps of drawing the notebook control object offscreen first and then drawing the completed image to the display screen all at once.

In another embodiment of the invention, the step of drawing the notebook control object offscreen includes painting a horizontal or a vertical notebook.

In an additional embodiment, the steps of painting a horizontal notebook include several tasks. One task initializes variables. Another task reinitializes the data of the notebook since it might be a resize. An additional task checks if numberOfPages is equal to zero. Another task adds 3-D effect for the top of a horizontal notebook or the first-side of a vertical notebook. Another task paints all nonselected tabs which can include painting, outlining and adding tab text to the nonselected tabs. Yet another task paints the selected tab which can include outlining the selected tab, drawing the background of the folder, painting and adding tab text to the selected tab. An additional task adds 3-D effects which can include painting bottom holes and wires for horizontal notebooks and painting second side holes and wires for vertical notebooks. Another task pains arrows for scrolling to offscreen folder tabs if not all folder tabs are displayed on the screen. An additional task adds a pagecount if more than one page exists in the folder. An additional task adds a page advance arrow if there are additional pages to advance to and/or adds a page decrement arrow if there are previous pages to select of the current folder.

In another embodiment of this invention, arrows permit wraparound to the first or last page as appropriate, or first or last offscreen folder.

In another embodiment, the step of processing user events can include several tasks. One task receives data into a tabStop data field. Another task receives keyDown events which indicates that a key has been pressed. If the key pressed was a tab key then the cursor jumps to the next tabStop data field. If a backward tab key was pressed then the cursor jumps to the previous tabStop data field. The tab keys can also wraparound. An additional task receives a mouseUp event indicating that a mouse button has been pressed. If a mouse button has been pressed, then the notebook control cycles through all the tabs, scroll arrows and page selection arrows and determines which if any invisible rectangles were selected.

In another embodiment of the method and system of the present invention, the object oriented notebook control object is written in Java. In another embodiment of the invention, the method and system of the notebook control object written in Java is an Applet.

The present invention is well suited to enabling a programmer to construct a platform independent notebook control. The method and system enable a more efficient way for a programmer to write a program. The method and system greatly reduce program development time by streamlining program flow coordination.

The invention yields significant performance advantages by drawing graphics offscreen and by using invisible rectangles to identify mouse selection events.

A feature of the present invention is that graphics may be painted offscreen and then drawn as a completed image to the screen. The advantage of drawing in this way is it yields significant performance advantages. Particularly, refresh rates are much faster. Refresh rates are once per refresh cycle rather than once per program cycle.

Another feature of the invention is the use of invisible rectangles for selecting folders and pages of a notebook rather than the alternative of using HTML mapping tables which require browser interaction. This feature yields mouse selection performance advantages which result in improved response time.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits(s) in the corresponding reference number.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE INVENTION

Figure 1A:
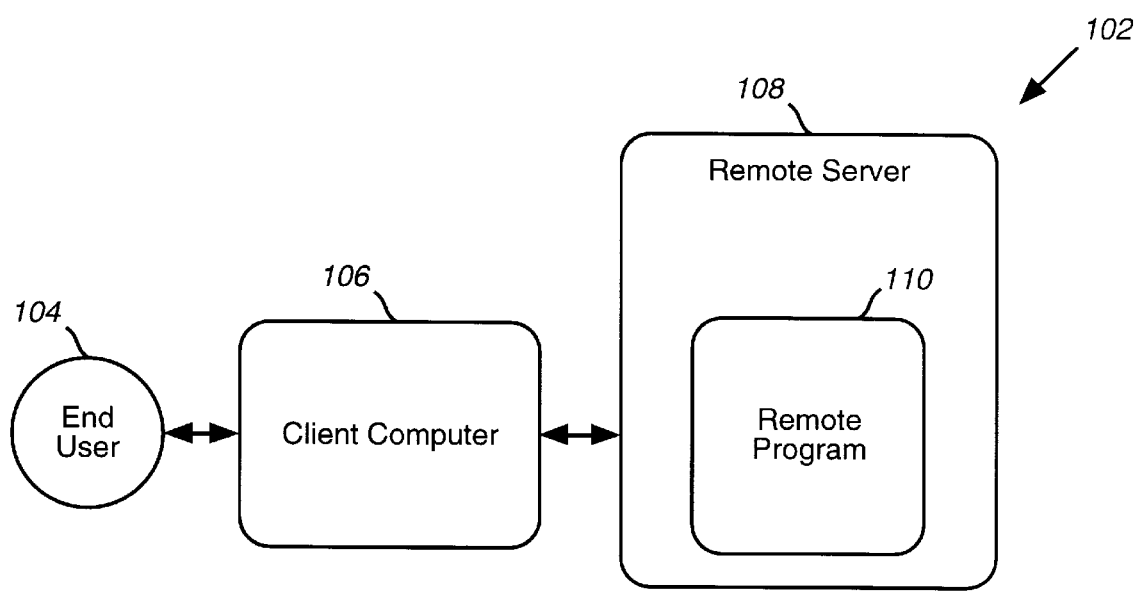
FIG. 1a is a distributed client/server computer system.

The preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Overview of the Invention

The present invention is directed to a Notebook Control graphical user interface using two object oriented classes. The present invention enables an application programmer to develop application software that provides the ability to organize and display data in the form of a notebook. The present invention creates a user-friendly graphical interface for an end user to maneuver through different folders and pages within folders using arrow buttons.

The notebook control is an object-oriented program written in an objectoriented programming language, such as Java, C++, etc. In a preferred embodiment, the notebook control program is written in an object-oriented programming language that enables program access to users connected to the internet, using a Java enabled browser or Java compatible run-time environment.

Object-oriented programming is comprised of software objects that interact and communicate with each other by sending one another messages. Software objects are often modeled from real-world objects found in everyday life. The present invention is modeled after a real-world notebook with folders and pages within folders.

The heart of the Notebook control is a dual dimensional vector. A vector is similar to a simple array except that the vector has no end. The vector allocates memory on an as needed basis. Using a vector is especially well suited for the Notebook control because the number of pages are unknown and an unlimited number of pages can be added.

The dual dimensional vector includes an x-axis which controls folder definition and a y-axis which controls pages within the folder. The Notebook control allows the programmer to create a notebook control with as many folders and pages within folders as is required by the specific application being developed. The present invention creates two new subclasses of an object called Panel, i.e. a Notebook and a Notebook Page. In essence, a Notebook can contain NoteBookPages.

Displaying the NoteBook involves additional features of the invention. Three dimensional effects are added to create the illusion of bulk and size for aesthetic design reasons and to assist in helping the end user understand how to use the invention. Tabs for each folder may be a variety of shapes, eg., rectangles, triangles, circles, squares. One embodiment will use tabs with rounded rectangles. Non-selected tabs are drawn before the selected tab in one embodiment. The selected tab is drawn so that it can be merged with the background. Bottom or side holes and spiral wires are added to further develop the notebook three-dimensional illusion.

The need for arrows to reach additional pages of the current folder is determined and then drawn if appropriate. This permits a folder to have more fields than a display screen would permit through the use of multiple pages. Invisible arrow selection rectangles are then added to identify mouse events. Determining which invisible rectangle the mouse pointer is within when the mouse button is selected, determines what page or folder to display. If there are multiple pages within a folder, the folder will also indicate which page the folder is displaying and out of a total of how many.

If more folders with tabs exist than can be displayed at one time depending on the size of the window, then folder selection arrows are drawn to permit scrolling to offscreen folders.

The notebook is adapted for use with a variety of input devices such as (but not limited to) keyboard and mouse. The tab-key and the backwards tab-key are used to cycle forward and backward through data fields of a page and permit wraparound. A mouse may be used to select a different folder by tab, to select a scroll to offscreen folder arrow, or to select a different page of the current folder by selecting page arrows.

A feature of the present invention involves using non-displayed rectangles (also called "invisible rectangles") to identify mouse selections. This feature results in the advantage of enhanced performance. Using invisible rectangles and the "inside" function avoids the need to use map tables. The advantage of this approach is that no browser interaction is required which achieves substantially improved input performance.

Another feature of the present invention involves drawing graphics offscreen and then drawing a completed image to the display screen yielding improved refresh rates. The resulting advantage is that graphics are refreshed every refresh cycle rather than every program cycle.

Implementation of the Invention

FIG. 1a illustrates a block diagram of a distributed client/server computer system 102 in which end user 104 interacts with client computer 106 connected to remote server computer 108 containing a remote program 110. In a preferred embodiment remote program 110 is an HTML file which invokes embedded Java applets or applications. In a preferred embodiment client computer 106 is capable of executing Java compatible application and applet programs. The end user 104 may by interacting with client computer 106 to cause remote program 110 to be downloaded to and executed on client computer 106.

Figure 1B:
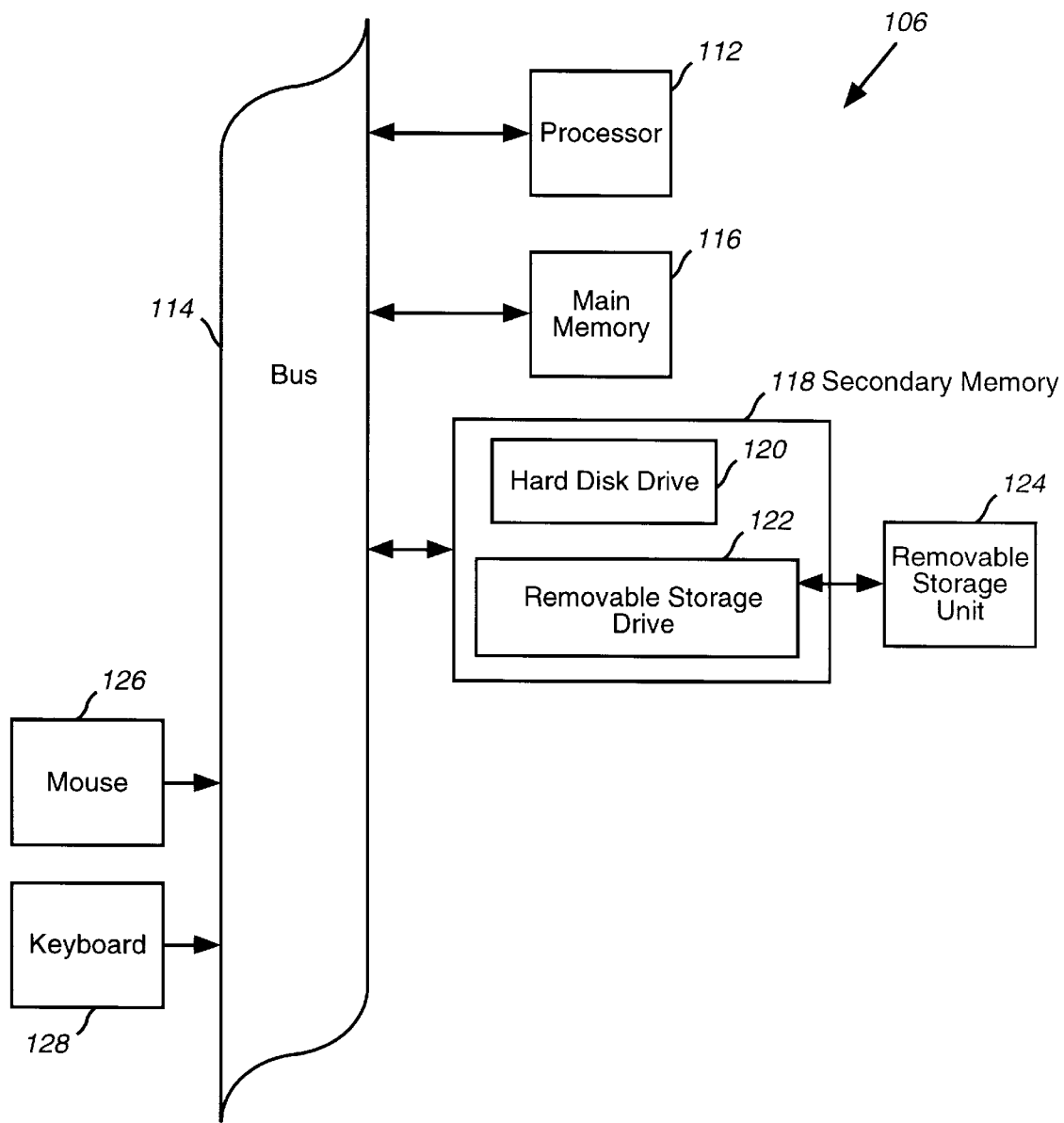
FIG. 1b is a block diagram of a computer system useful for implementing the present invention.

The present invention is platform independent. Client computer 106 in a preferred embodiment is a personal computer (PC) system running an operating system such as Windows 95 or OS/2, a Mac, or a UNIX based system. However, the invention is not limited to these platforms. Instead, the invention can be implemented on any appropriate computer system running any appropriate operating system, such as Solaris, Irix, Linix, HPUX, OSF Windows 95, Windows NT, OS/2, Macintosh, and any others supporting Java. In one embodiment, the present invention is implemented on a computer system operating as discussed herein. An exemplary computer system, client computer 106 is shown in FIG. 1b. Other components of the invention, such as the computer system 102 and/or the remote server computer 108, could also be implemented using a computer such as that shown in FIG. 1b. The computer system 106 includes one or more processors, such as processor 112. The processor 112 is connected to a communication bus 114.

The Client Computer 106 also includes a main memory 116, preferably random access memory (RAM), and a secondary memory 118. The secondary memory 118 includes, for example, a hard disk drive 120 and/or a removable storage drive 122, representing a floppy diskette drive, a magnetic tape drive, a compact disk drive, etc. The removable storage drive 122 reads from and/or writes to a removable storage unit 124 in a well known manner.

Removable storage unit 124, also called a program storage device or a computer program product, represents a floppy disk, magnetic tape, compact disk, etc. The removable storage unit 124 includes a computer usable storage medium having stored therein computer software and/or data, such as an object's methods and data.

Client Computer 106 also includes an input device such as (but not limited to) a mouse 126 or other pointing device such as a digitizer, and a keyboard 128 or other data entry device.

Computer programs (also called computer control logic), including object oriented computer programs, are stored in main memory 116 and/or the secondary memory 118 and/or removable storage units 124, also called computer program products. Such computer programs, when executed, enable the computer system 106 to perform the features of the present invention as discussed herein. In particular, the computer programs, when executed, enable the processor 112 to perform the features of the present invention. Accordingly, such computer programs represent controllers of the computer system 106.

In another embodiment, the invention is directed to a computer program product comprising a computer readable medium having control logic (computer software) stored therein. The control logic, when executed by the processor 112, causes the processor 112 to perform the functions of the invention as described herein.

In yet another embodiment, the invention is implemented primarily in hardware using, for example, one or more state machines. Implementation of these state machines so as to perform the functions described herein will be apparent to persons skilled in the relevant art(s).

Software Objects in an Object-Oriented Programming Environment

Figure 1C:
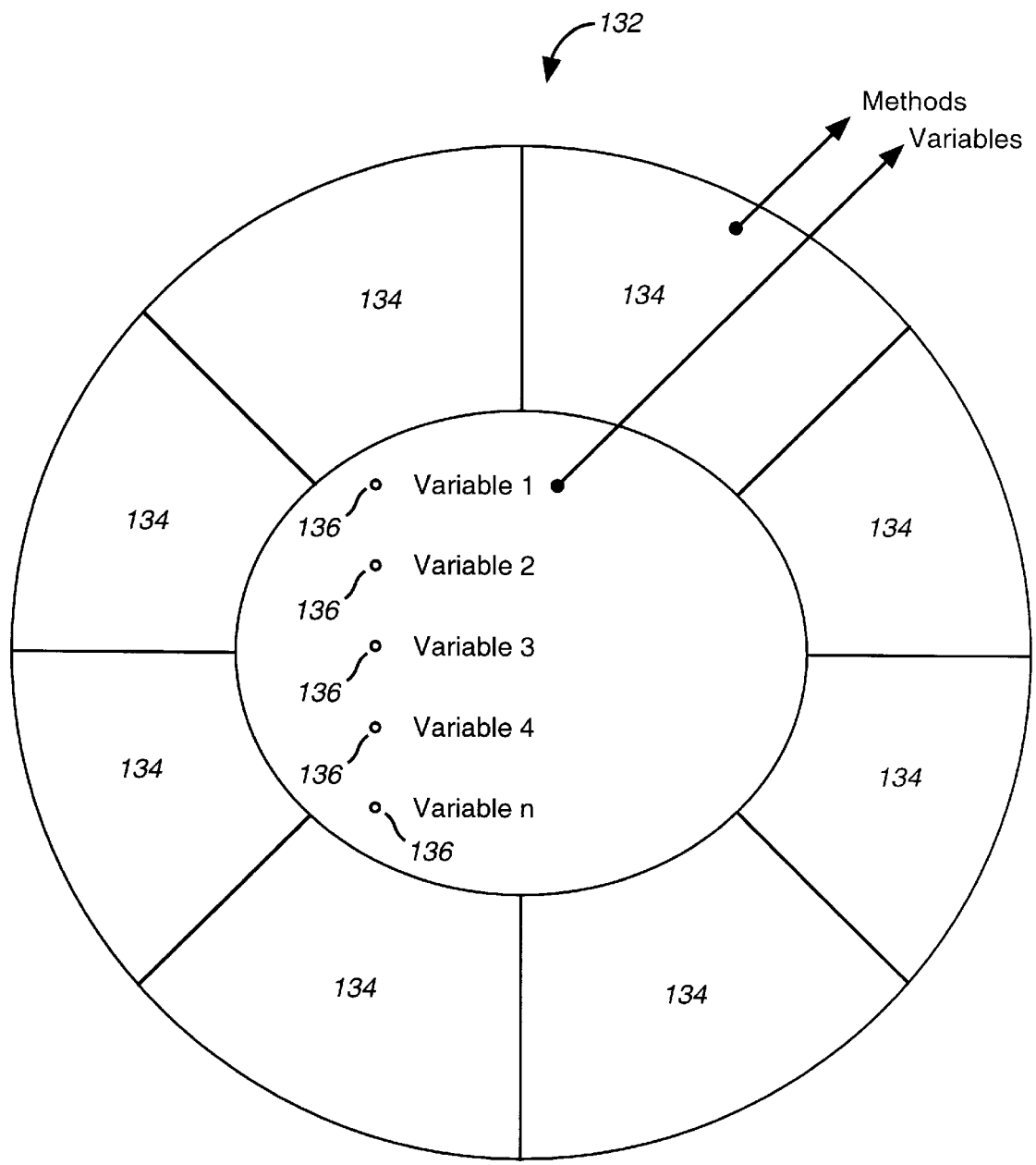
FIG. 1c is a graphical representation of a software object.

Prior to describing the invention in detail, a description of an exemplary software object in an object oriented programming environment will be described. FIG. 1c is a graphical representation of a software object 132. Software object 132 is comprised of methods 134 and variables 136. Methods 134 are software procedures that when executed, cause a software object's variables 136 to be manipulated as needed to reflect the effects of actions of software object 132. The performance of software object 132 is expressed by its methods 134. The knowledge of software object 132 is expressed by its variables 136.

In object oriented programming, software objects 132 are outgrowths (or instances) of a particular class. A class defines methods 134 and variables 136 that are included in a particular type of software object 132. Software objects 132 that belong to a class are called instances of the class. A software object 132 belonging to a particular class will contain specific values for the variables contained in the class. For example, a software class of vehicles may contain objects that define a car, a bus, a truck, a trailer and a motorcycle.

In object oriented programming, classes are arranged in a hierarchical structure. Objects that are defined as a special case of a more general class automatically inherit the method and variable definitions of the general class. The general class is referred to as the super class. The special case of the general class is referred to as the subclass of the general class. In the example above, vehicles is the general class and is therefore, referred to as the super class. The objects (i.e. car, bus, truck, trailer, motorcycle) are all special cases of the general class, and therefore are referred to as subclasses of the vehicle class.

The Notebook Control Graphical User Interface

Figure 2:
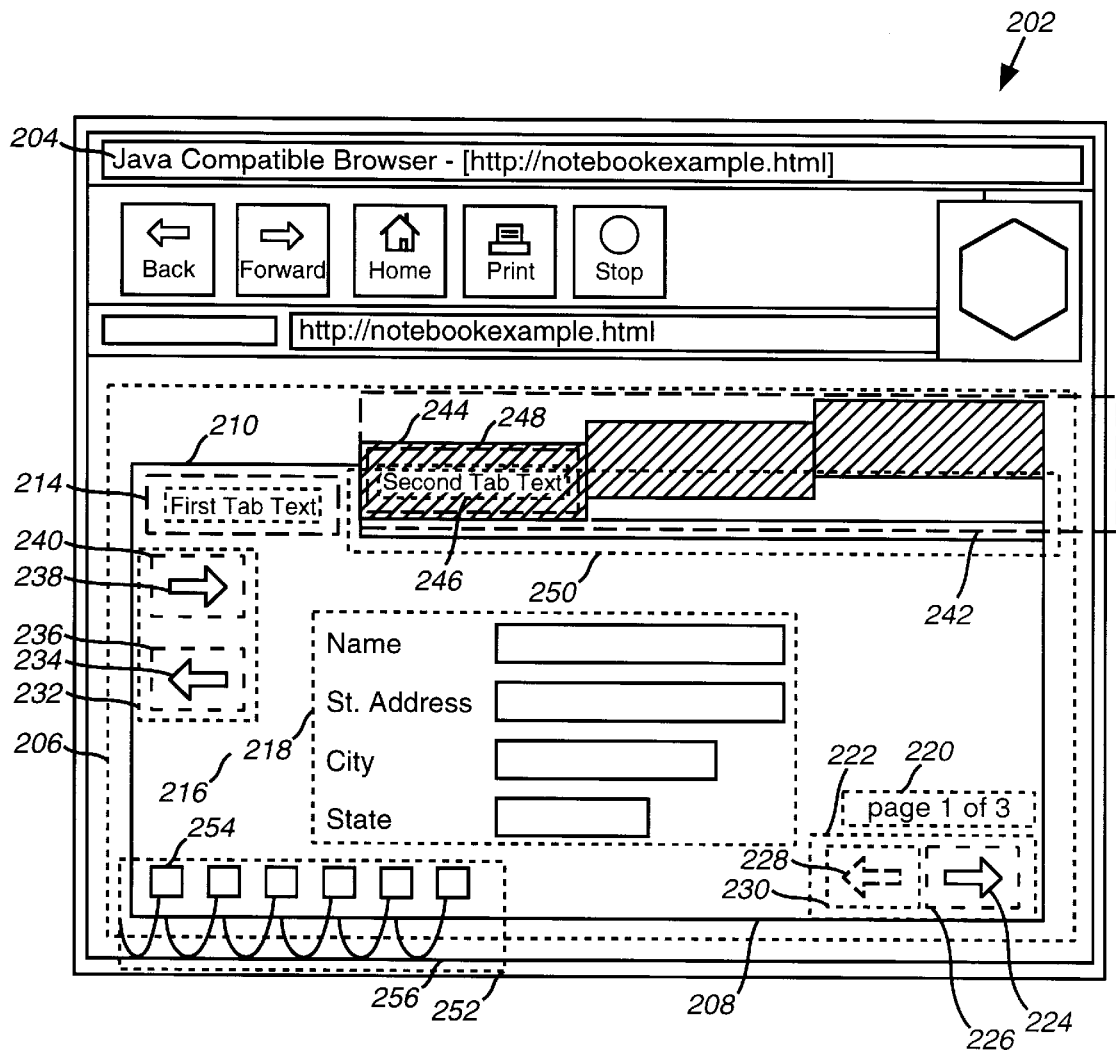
FIG. 2 is a screen display of a horizontal notebook control applet.
Figure 3:
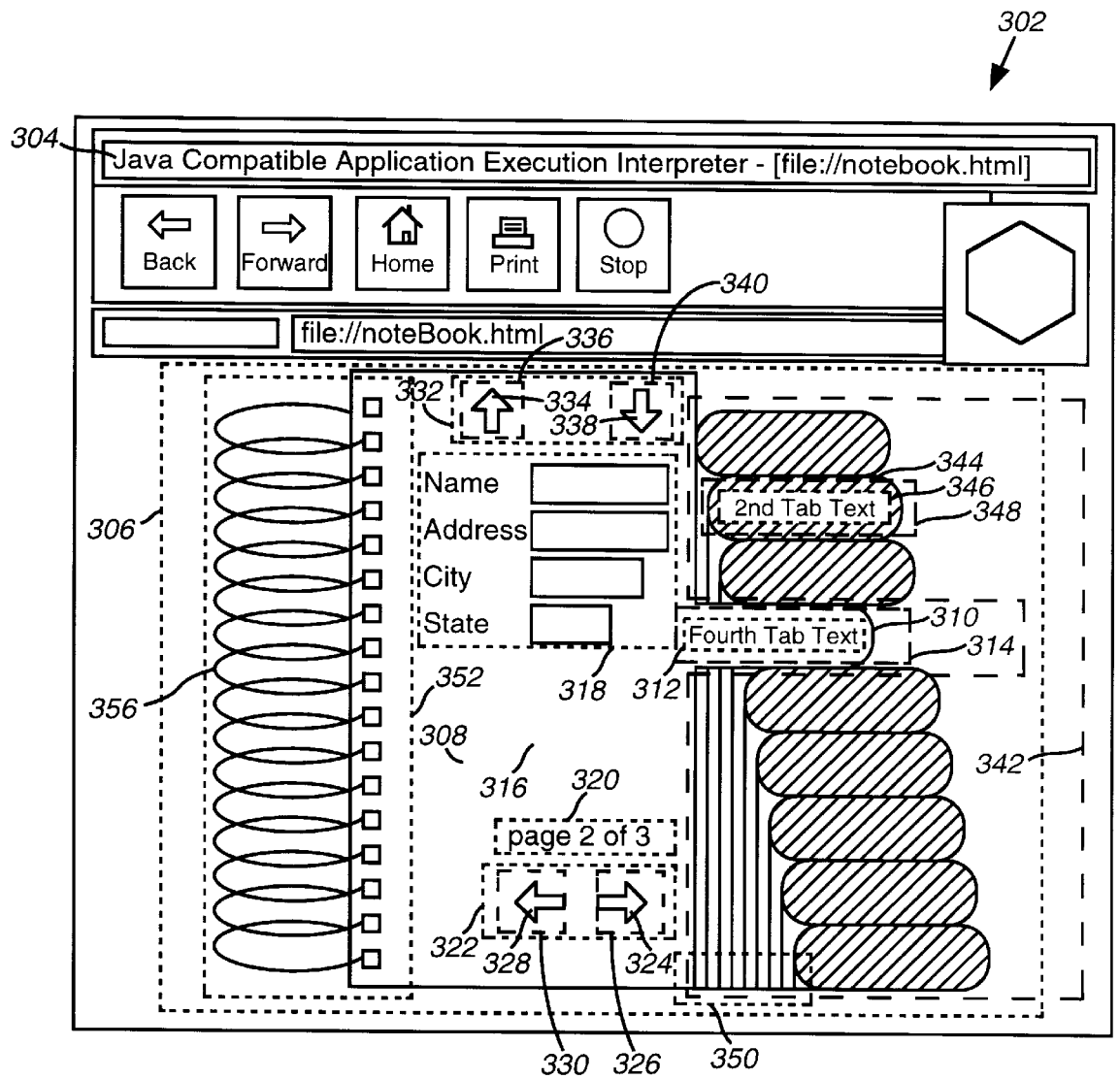
FIG. 3 is a screen display of a vertical notebook control application.
Figure 4:
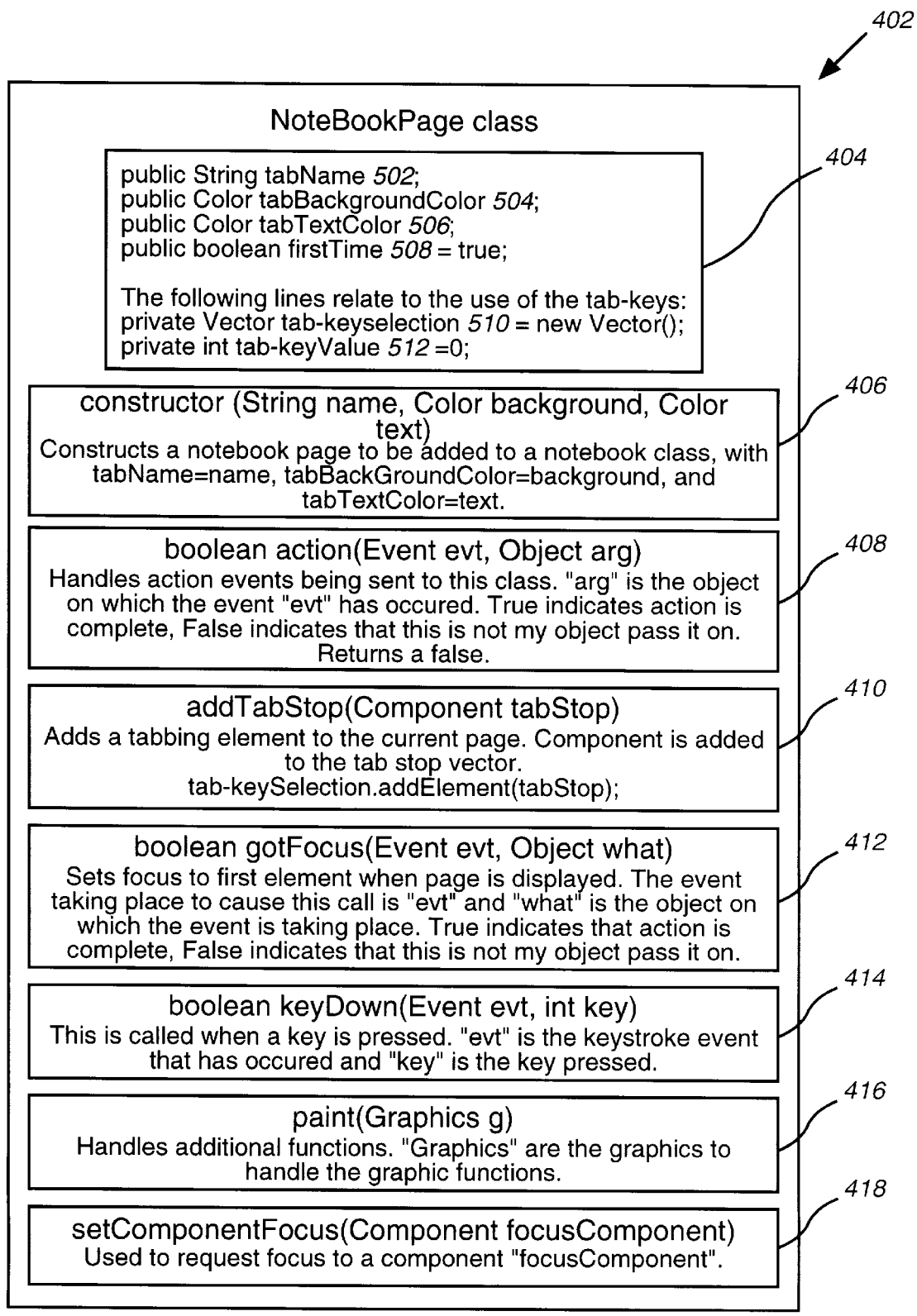
FIG. 4 is a graphical representation of the NotebookPage Class.
Figure 9:
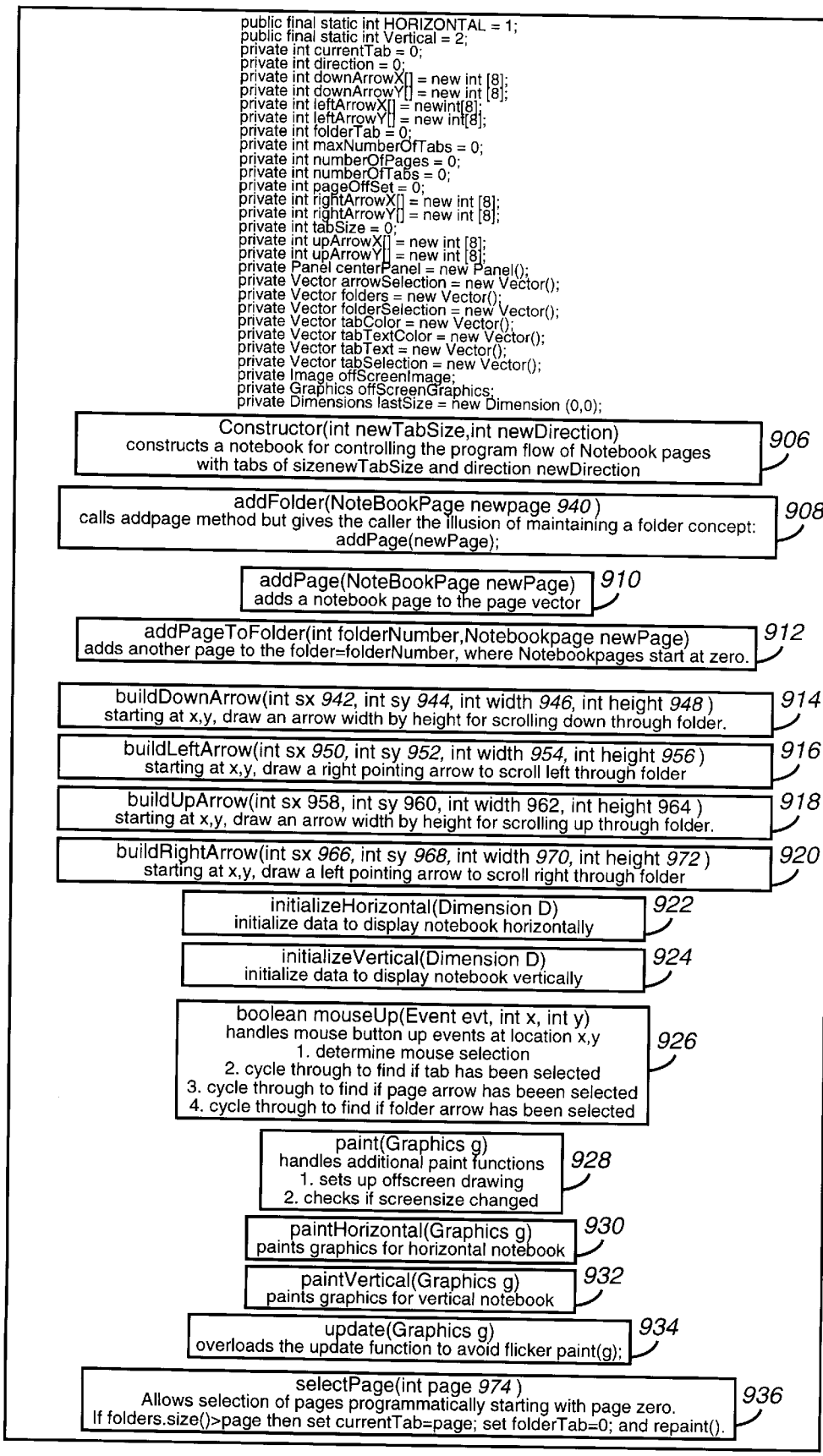
FIG. 9 is a graphical representation of the Notebook Class.
Figure 22:
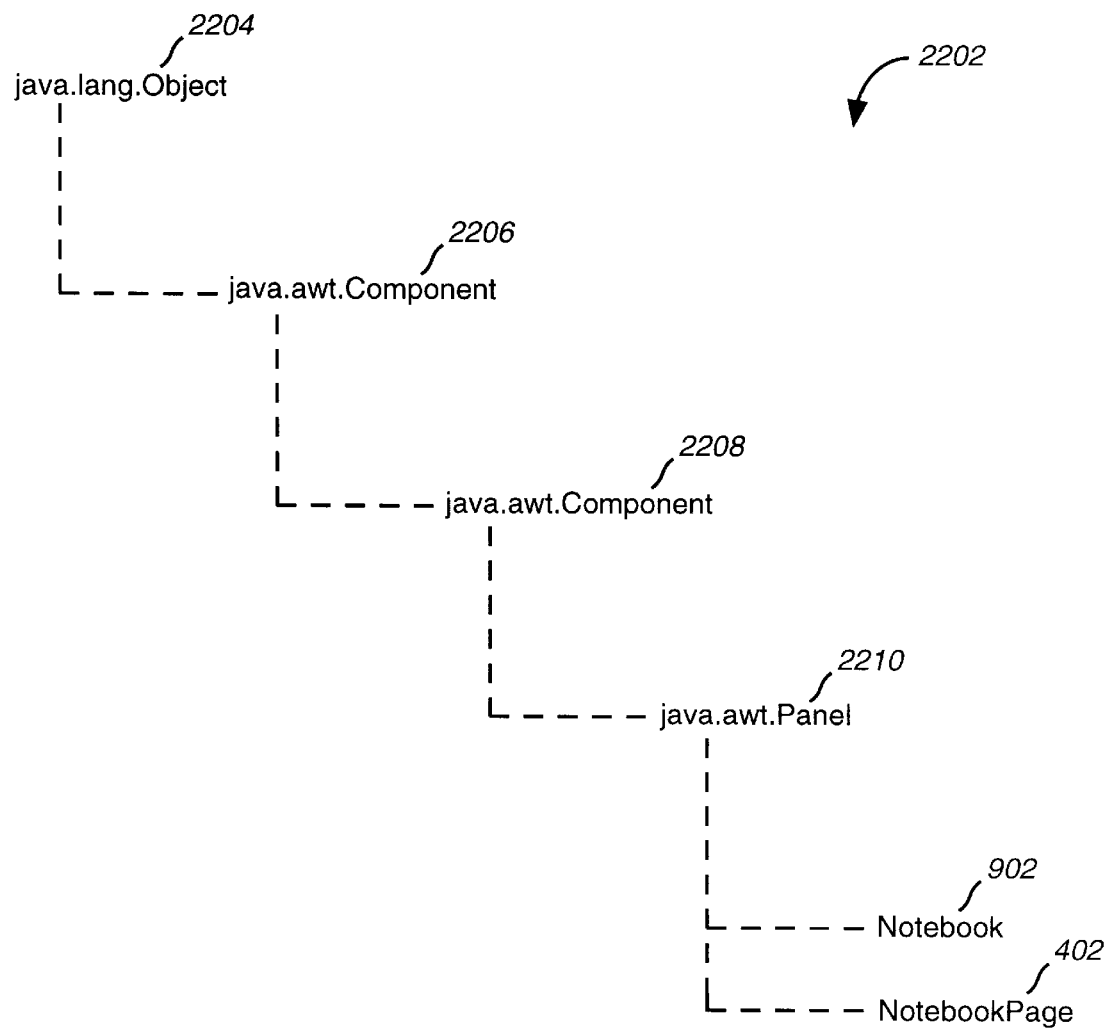
FIG. 22 is a graphical representation of the class hierarchy for the Notebook and NotebookPage classes.

The present invention includes two Java object oriented classes NotebookPage class 402 and Notebook class 902, detailed in FIGS. 4 and 9 respectively. FIG. 22 described below, represents the class hierarchy 2202 for NotebookPage class 402 and Notebook class 902. These two Java classes may be used to create a Notebook Control graphical user interface. FIGS. 2 and 3 detail two embodiments of a notebook control graphical user interface, horizontal notebook control applet system 202 and vertical notebook control application system 302.

Horizontal Notebook Control

FIG. 2 illustrates an example computer display generated by a horizontal notebook control applet system 202 computer software running on client computer 106 including a Java compatible browser 204 running embedded horizontal notebook applet 206. Horizontal notebook applet 206 displays current folder 208 having current tab 210 for displaying current tab text 212, and current tab invisible selection rectangle 214 of approximately the same size as current tab 210 for selection thereof by end user 104 with mouse 126 of client computer 106. The example shown in FIG. 2 is an address book. Note that tabs 210 and 244 run horizontally across the display. Current folder 208 displays current page 216 including data entry fields 218 and pagenumber indicator 220 indicating the current page number if there are a plurality of pages. When current folder 208 has more than one page, additional page selection arrows 222 are displayed on current folder 208 including advance page selection arrow 224 and decrement page selection arrow 228. Advance page selection arrow 224 and decrement page selection arrow 228 may be selected by mouse 126 selection of invisible advance page selection rectangle 226 and invisible decrement page selection rectangle 230, respectively. Whether either or both additional page selection arrows 222 will be displayed depends upon whether current folder 208 has more than one page and if so which page has been selected.

When too many folders exist to display all folder tabs on the screen at one time, current folder 208 may display offscreen folder selection arrows 232. Offscreen folder selection arrows 232 include scroll left folder selection arrow 234 and scroll right folder selection arrow 238, for mouse selection of offscreen folders. Selection by mouse 126 of scroll left folder selection arrow 234 and scroll right folder selection arrow 238 is accomplished using invisible scroll left folder selection rectangle 236 and invisible scroll right folder selection rectangle 240, respectively. Whether either or both offscreen folder selection arrows 232 will be displayed depends upon whether offscreen folders exist and which current folder 208 has been selected.

Horizontal notebook applet 206 also includes nonselected folders 242 each having nonselected folder selection tab 244 for displaying nonselected folder tab text 246, and invisible nonselected folder tab selection rectangle 248 for mouse 126 selection of nonselected folders 242.

Horizontal notebook applet 206 further includes top 3-D effect 250 and bottom 3-D effect 252 including holes 254 and wires 256 to provide the graphical features of the notebook.

Vertical Notebook Control

FIG.3 illustrates an example computer display generated by a vertical notebook control application system 302 computer software running on client computer 106 including Java compatible application execution environment 304 executing vertical notebook application 306. Vertical notebook application 306 includes current folder 308 having current tab 310 displaying current tab text 312, and current tab invisible selection rectangle 314 for selection with mouse 126 of client computer 106. Note that tabs 310 and 342 run vertically down the display. Current folder 308 displays current page 316 including data entry fields 318 and pagenumber indicator 320 indicating the current page number if there are a plurality of pages. Additional page selection arrows 322 may be displayed on current folder 308 if current folder 308 has more than one page. Additional page selection arrows 322 include advance page selection arrow 324 and decrement page selection arrow 328 for mouse 126 selection of pages, using invisible advance page selection rectangle 326 and invisible decrement page selection rectangle 330, respectively. Whether either or both additional page selection arrows 322 will be displayed depends upon whether current folder 308 has more than one page and and if so which page is displayed.

Current folder 308 may also include offscreen folder selection arrows 332, if more folders exist than can be displayed at one time. Offscreen folder selection arrows 332 include both scroll up folder selection arrow 334 and scroll down folder selection arrow 338, for selection of offscreen folders by mouse 126 selection of invisible scroll up folder selection rectangle 336 or invisible scroll down folder selection rectangle 340, respectively. Whether either or both offscreen folder selection arrows 332 will be displayed depends upon whether offscreen folders exist and which current folder 208 has been selected.

Vertical notebook application 306 further includes nonselected folders 342 having nonselected folder selection tab 344 displaying nonselected folder tab text 346 and having invisible nonselected folder tab selection rectangle 348 for mouse 126 selection of Nonselected Folders 342.

Vertical notebook application 306 further includes first side 3-D effect 350 and second side 3-D effect 352 including holes 354 and wire 356 to provide the graphical features of the notebook.

NotebookPage Class

FIG. 4 illustrates public NotebookPage class 402 extending Panel class 2210 (see FIG. 22). NotebookPage class 402 includes NotebookPage Constructor 406 and NotebookPage class variables 404, further described in FIG. 5. NotebookPage class 402 also includes the following methods:

(1) action method 408 returning a boolean value;
(2) addTabStop method 410;
(3) gotFocus method 412 returning a boolean value;
(4) keyDown method 414 returning a boolean value;
(5) paint method 416; and
(6) setComponentFocus method 418.

Figure 5:
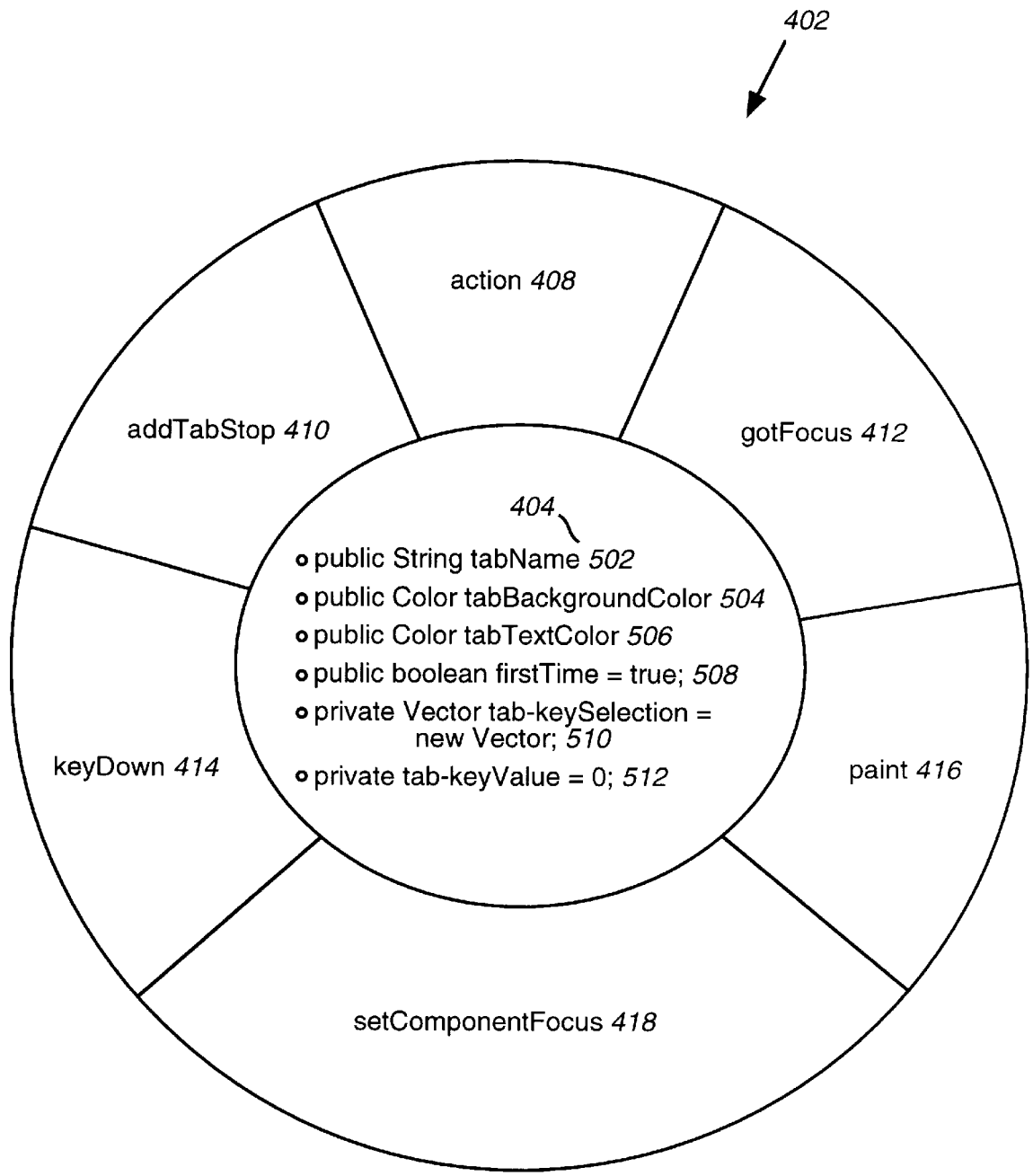
FIG. 5 is a graphical representation of the NotebookPage Class variables.

FIG.5 illustrates NotebookPage class six variables 404, each with access specifier, type and name including:

(1) public String tabName 502;
(2) public Color tabBackgroundColor 504;
(3) public Color tabTextColor 506; and
(4) public boolean firstTime 508 initialized true. Additional NotebookPage class variables 404, relating to responses to the tab-key & backwards tab-key keys include:
(5) private Vector tab-keySelection 510 initially set to an empty Vector; and
(6) private int tab-key Value 512 initialized to zero.

An object is created by instantiating a class. When an instance of the class is created, a constructor function is automatically invoked. The constructor function initializes the variables of the object just created. Constructor functions have the same name as the object class.

NotebookPage constructor 406 of FIG. 4 includes three parameters of types and names, String name, Color background and Color text. NotebookPage constructor 406 constructs a notebook page to be added to a notebook class taking as input the value of the parameters, setting tabName to name, tabBackGroundColor to background, and tabTextColor to text.

The action method 408 of FIG. 4 handles an action event of name evt of type Event, occurring on object arg of type Object, being sent to the class. The action method 408 returns a boolean value of false if the object does not belong to the Notebookpage class or indicates a value of true if action is complete.

The addTabStop method 410 of FIG. 4 adds a data field 218 or 318 tab-keySelection 510 of tabbing element named tabStop of type Component to the current page.

The paint method 416 of FIG. 4 handles additional graphics functions and has a parameter of name g of type Graphics.

Figure 6:
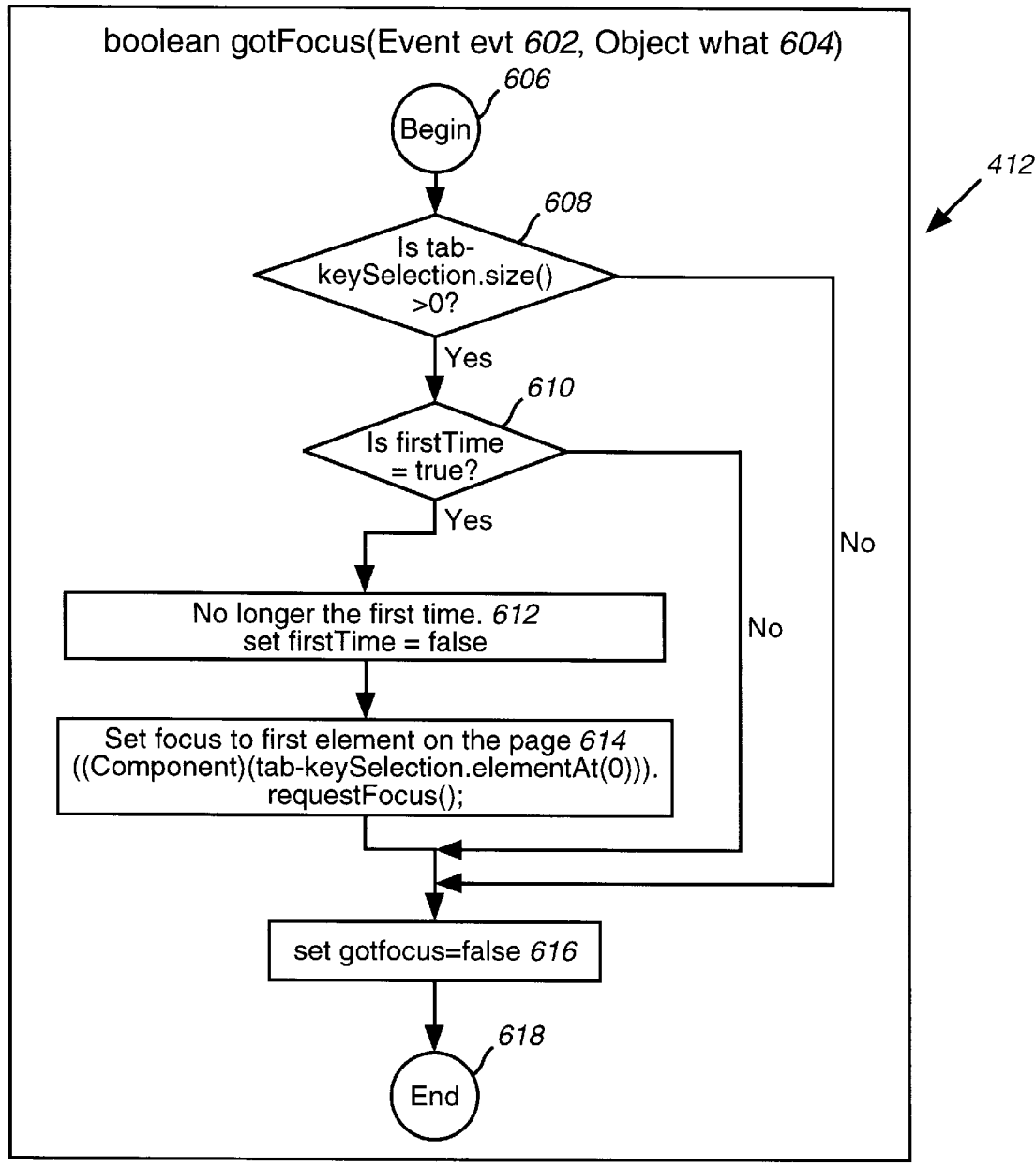
FIG. 6 is a flow diagram of the gotFocus method.

FIG. 6 illustrates a flow chart depicting the operation of the gotFocus method 412 which acts upon parameters of types and names, Event evt 602 and Object what 604. The gotFocus method 412 sets the focus to the first element when a page is displayed. The gotFocus method 412 begins with step 606 which immediately continues with step 608 which checks if the size of tab-keySelection 510 is greater than zero indicating that the page has tab-keySelection 510 number of data fields 218 or 318, and if so, then executes step 610; if not so then executes step 616 which sets return value of gotFocus method 412 to false and executes step 618. Step 610 of gotFocus method 412 checks if firstTime variable 508 equals true, if so, execution continues with step 612 which sets firstTime 508 to false and executes step 618; if not so, execution continues with step 616 which sets gotFocus method 412 return value to false and executes step 618. From step 612 execution continues to step 614 which sets focus to the first tab-keySelection element 510 on the page and continues with step 616 which sets gotFocus method 412 return value to false and executes step 618. Operation of gotFocus is complete after execution of step 616 as indicated by step 618.

Figure 7:
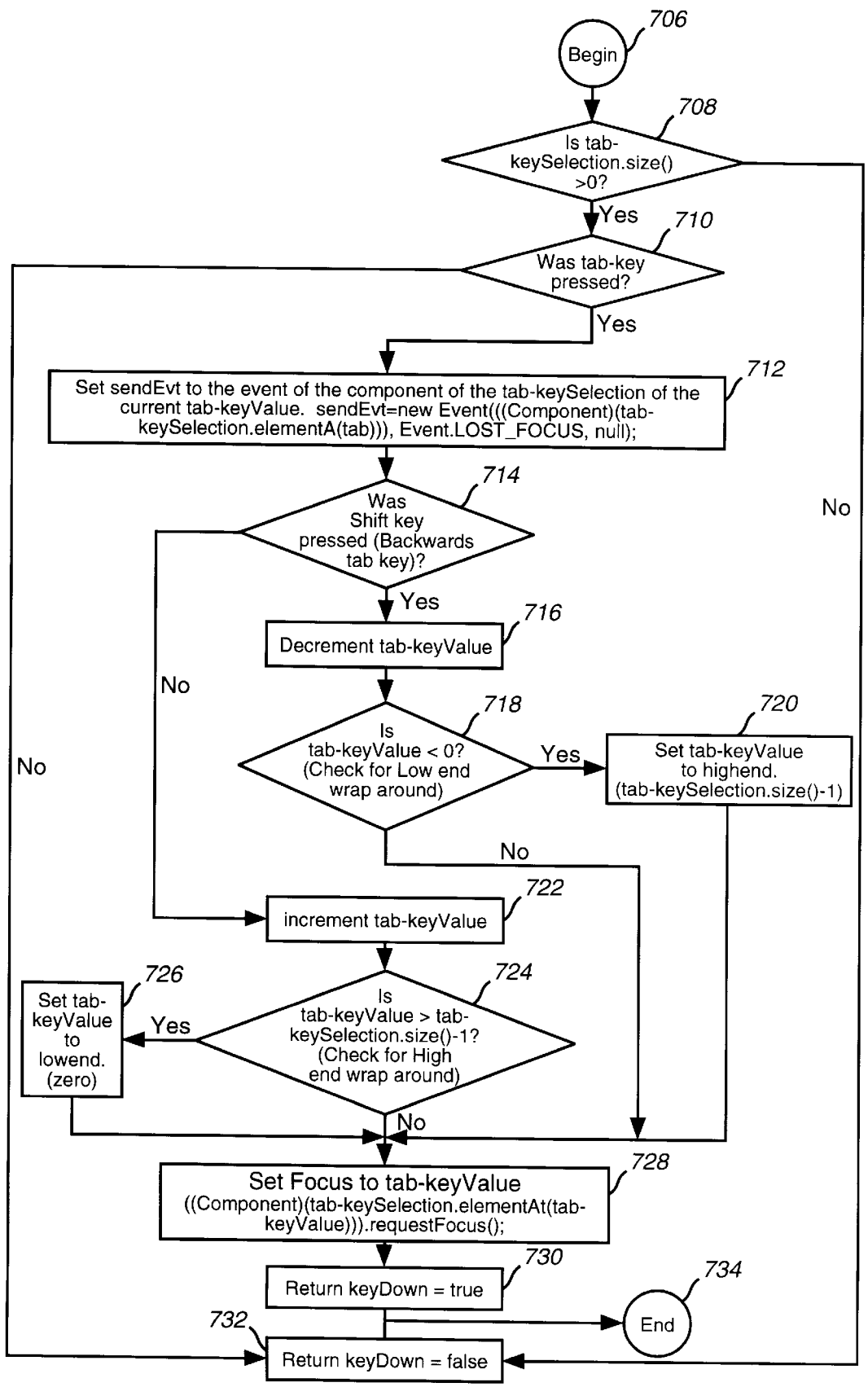
FIG. 7 is a flow diagram of the keyDown method.

FIG. 7 illustrates the keyDown method 414 which includes keyDown method 414 parameters of types and names, Event evt 702 and int key 704. The keyDown method 414 is invoked when a key has been pressed. The keyDown method 414 begins with step 706 and continues immediately with step 708 which checks if size of tab-keySelection 510 is greater than zero, if so, then execution continues with step 710; and if not so, then keydown method 414 continues to step 732. Step 710 of keyDown method 414 checks if a tab-key was pressed, if not, then execution continues to step 732; and if so, then execution continues with step 712 of which sets sendEvt 702 to the event of the component of the tab-keySelection 510 data field element at the current tab-keyValue 512 and continues with step 714. Step 714 of keyDown method 414 checks if the shift key was pressed which means that the Backwards tab-key was pressed, if so, then keyDown method 414 continues with step 716 which decrements tab-keyValue 512 and continues with step 718; if not, then execution continues with step 722 which increments tab-keyValue 512 and continues with step 724. Step 718 checks if tab-keyValue 512 is less than zero to see if there was a low end wrap around, if so, then execution continues with step 720; if there was no low end wrap around, then keyDown method 414 continues at step 728. Step 720 sets tab-keyValue 512 to the high end data element which equals the size of tab-keySelection 510 less one and execution continues with step 728. Step 724 checks if tab-keyValue 512 is greater than the highend element to see if there was a high end wrap around, if so then keyDown method 414 continues with step 726; if there was no high end wrap around then keyDown method 414 continues directly with step 728. Step 726 sets tab-keyValue 512 to the low end data element, zero, and continues with step 728. Step 728 requests focus to the component of tab-keySelection 510 element at tab-keyValue 512 which places the cursor at the selected data field for data entry, and continues with step 730. Step 730 sets keyDown method 414 return value to true indicating no tab-key was pressed and continues to step 734. Step 732 sets keyDown method 414 value to false indicating no tab-key was pressed and continues to step 734. Step 734 represents the end of processing of keyDown method 414.

Figure 8:
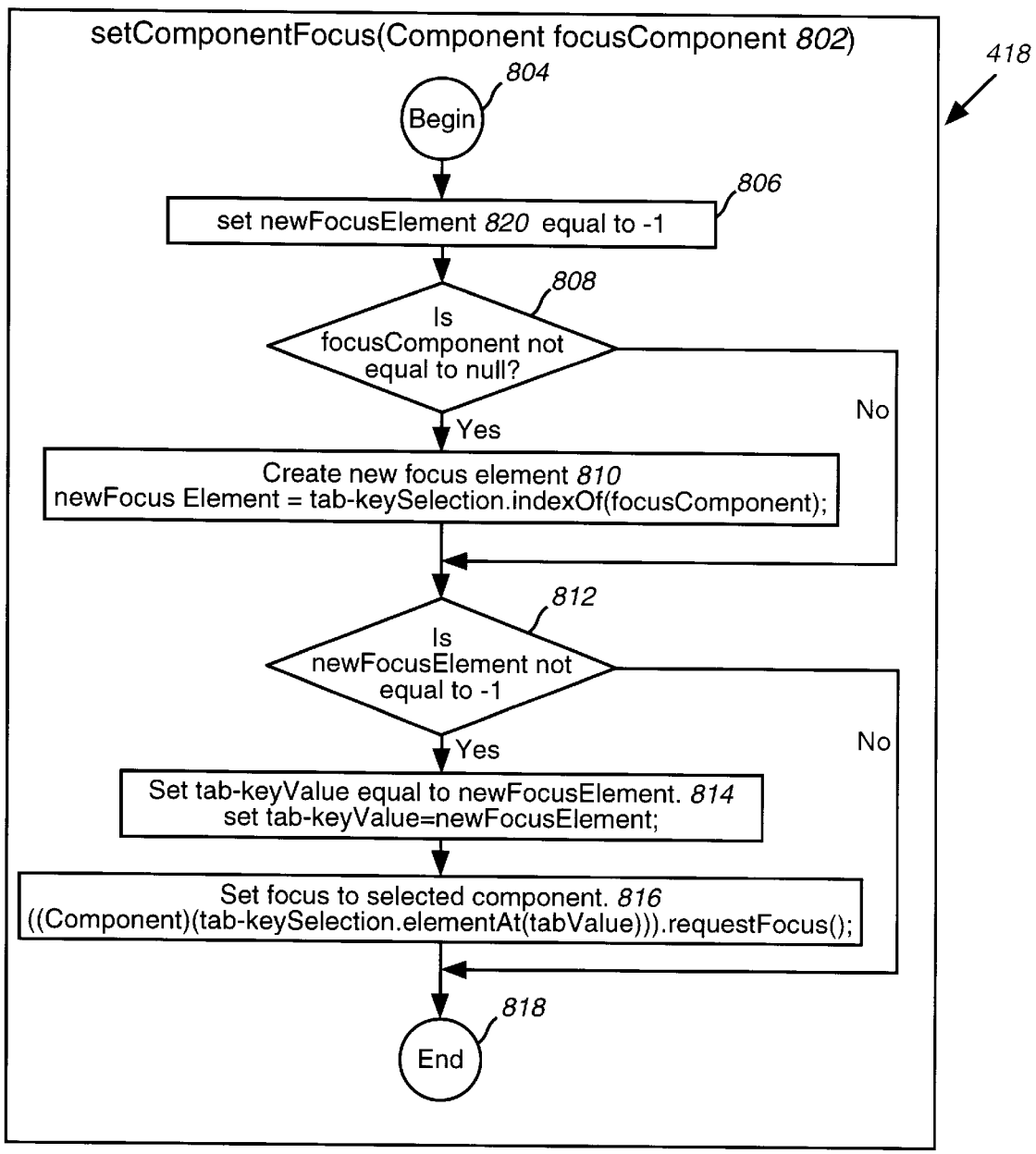
FIG. 8 is a flow diagram of the setComponentFocus method.

FIG. 8 illustrates setComponentFocus method 418 which has parameter of type Component and name focusComponent 802. The setComponentFocus method 418 is used to request focus to a component focusComponent 802. The setComponentFocus method 418 begins with step 804 which immediately continues to step 806 which defines an integer variable newFocusElement 820 which it sets equal to negative one and then continues to step 808. Step 808 of setComponentFocus method 418 checks if focusComponent 802 is not equal to null, meaning a focus element has been provided, if so, then execution continues with step 810; if not then execution continues with step 812. Step 810 of setComponentFocus method 418 creates a newFocusElement 820 which it sets equal to tab-keySelection 510 index of focusComponent 804, then execution continues to step 812. Step 812 of setComponentFocus method 418 checks if newFocusElement 820 is not equal to negative one, if it is then execution continues with step 814; if not then execution continues with step 818. Step 814 of setComponentFocus method 418 sets tab-keyValue 512 equal to newFocusElement 820 and then continues to step 816. Step 816 sets focus to the selected component by requesting focus to the component of tab-keySelection 510 element at tab-keyValue 512 and continues with step 818. Step 818 represents the completion of the setComponentFocus method 418.

Notebook Class

FIG. 9 illustrates public Notebook class 902 which is used to construct a notebook control applet or application. Notebook class 402 extends Panel class (see FIG. 22 below), including Notebook constructor 906 and Notebook class variables 904, further described in FIG. 10 below. Notebook class 902 also includes fifteen methods, including:

(1) addFolder method 908;
(2) addPage method 910;
(3) addPageToFolder method 912;
(4) buildDownArrow method 914;
(5) buildLeftArrow method 916;
(6) buildUpArrow method 918;
(7) buildRightArrow method 920;
(8) initializeHorizontal method 922;
(9) initializeVertical method 924;
(10) mouseUp method 926 returning a boolean value;
(11) paintHorizontal method 928;
(12) paintVertical method 930;
(13) paint method 932;
(14) update method 934; and
(15) selectPage method 936.

Figure 10:
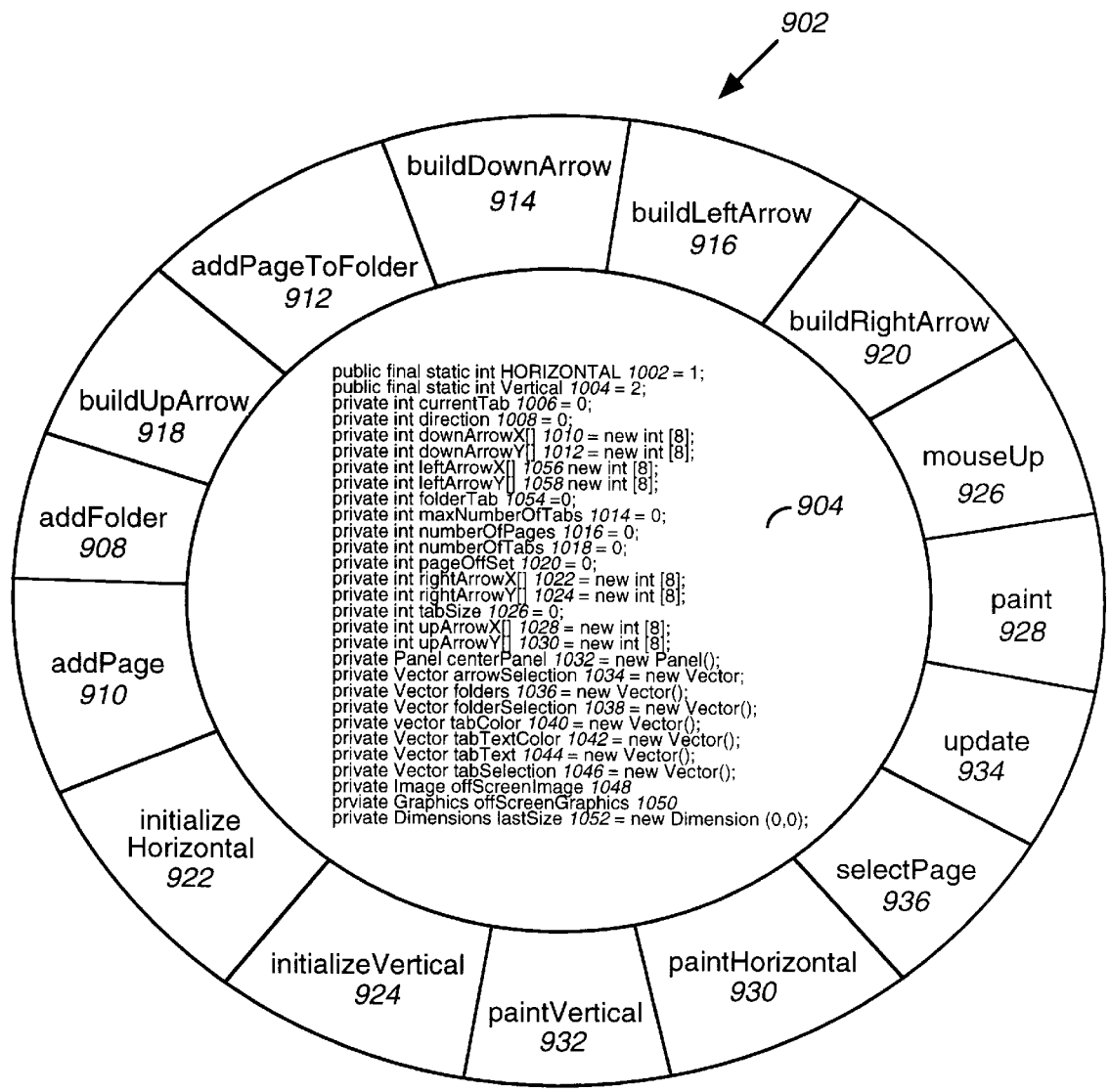
FIG. 10 is a graphical representation of the Notebook Class Variables.

FIG. 10 illustrates 29 variables 904 each with access specifier, type and name including:

(1) public final static int HORIZONTAL 1002 initialized to one;
(2) public final static int VERTICAL 1004 initialized to two;
(3) private int currentTab 1006 set to zero;
(4) private int direction 1008 set to zero;
(5) private int downArrowX[0] 1010 set to new int [8];
(6) private int downArrowY[0] 1012 set to a new int [8];
(7) private int maxNumberOfTabs 1014 set to zero;
(8) private int numberOfPages 1016 set to zero;
(9) private int numberOfTabs 1018 set to zero;
(10) private int pageOffSet 1020 set to 0;
(11) private int righArrowX[0] 1022 set to new int [8];
(12) private int rightArrowY[0] 1024 set to new int [8];
(13) private int tabSize 1026 set to zero;
(14) private int upArrowX[0] 1028 set to new int [8];
(15) private int upArrowY[0] 1030 set to new int [8];
(16) private Panel centerPanel 1032 set new Panel( );
(17) private Vector arrowSelection 1034 set to new Vector( );
(18) private Vector folders 1036 set to new Vector( );
(19) private Vector folderSelection 1038 set to new Vector( );
(20) private Vector tabColor 1040 set to new Vector( );
(21) private Vector tabTextColor 1042 set to new Vector( );
(22) private Vector tabText 1044 set to new Vector( );
(23) private Vector tabSelection 1046 set to new Vector( );
(24) private Image offScreenImage 1048;
(25) private Graphics offScreenGraphics 1050;

(26) private Dimension lastSize 1052 set to new Dimension (0,0);

(27) private int folderTab 1054 set to zero;

(28) private int leftArrowX[ ] 1056 set to new int[8]; and

(29) private int leftArrowY[ ] 1058 set to new int[8].

The addFolder method 908 of FIG. 9 having parameter newpage 940 of type NoteBookPage, calls addPage method 910 to create newpage 940 maintaining a folder concept.

The buildDownArrow method 914 of FIG. 9 is invoked to draw a downward pointing arrow. The buildDownArrow method 914 has parameters (all of type int) including:

(1) sx 942;

(2) sy 944;

(3) width 946; and (4) height 948.

The buildDownArrow method 914 starts at point (sx 942, sy 944) drawing an eight sided polygon arrow of dimensions width 946 by height 948 for scrolling down to offscreen folders. The polygon begins at point downArrowX[0] 1010 equal to sx 942 plus one third of width 946, and downArrowY[0] 1012 equal to sy 944. The polygon continues to point downArrowX[1] 1010 equal to sx 942 plus one third of width 946, and downArrowY[1] 1012 equal to sy 944 plus one half of height 948. The polygon continues to point downArrowX[2] 1010 equal to sx 942, and downArrowY[2] 1012 equal to sy 944 plus one half of height 948. The polygon continues to point downArrowX[3] 1010 equal to sx 942 plus one half of width 946, and downArrowY[3] 1012 equal to sy 944 plus height 948. The polygon continues to point downArrowX[4] 1010 equal to sx 942 plus width 946, and downArrowY[4] 1012 equal to sy 944 plus one half of height 948. The polygon continues to point downArrowX[5] 1010 equal to sx 942 plus two thirds of width 946, and downArrowY[5] 1012 equal to sy 944 plus one half of height 948. The polygon continues to point downArrowX[6] 1010 equal to sx 942 plus two thirds of width 946, and downArrowY[6] 1012 equal to sy 944. The polygon continues to point downArrowX[7] 1010 equal to sx 942 plus one third of width 946, and downArrowY[7] 1012 equal to sy 944.

The buildLeftArrow method 916 is invoked to create a scroll left arrow which points to the right. The buildLeftArrow method 916 of FIG. 9 having parameters (all of type int) including:

(1) sx 950;

(2) sy 952;

(3) width 954; and (4) height 956.

The buildUpArrow method 918 starts at point (sx 950, sy 952) drawing a right pointing eight sided polygon arrow of dimensions width 954 by height 956 for scrolling left to offscreen folders or previous pages. The polygon begins at point leftArrowX[0] 1056 equal to sx 950 plus one half of width 954, and leftArrowY[0] 1058 equal to sy 952. The polygon continues to point leftArrowX[1] 1056 equal to sx 950 plus one half of width 954, and leftArrowY[1] 1058 equal to sy 952 plus one third of height 956. The polygon continues to point leftArrowX[2] 1056 equal to sx 950, and leftArrowY[2] 1058 equal to sy 952 plus one third of height 956. The polygon continues to point leftArrowX[3] 1056 equal to sx 950, and leftArrowY[3] 1058 equal to sy 952 plus two thirds height 956. The polygon continues to point leftArrowX[4] 1056 equal to sx 950 plus one half of width 954, and leftArrowY[4] 1058 equal to sy 952 plus two thirds height 956. The polygon continues to point leftArrowX[5] 1056 equal to sx 950 plus one half of width 954, and leftArrowY[5] 1058 equal to sy 952 plus height 956. The polygon continues to point leftArrowX[6] 1056 equal to sx which sets tab-keyValue 512 to the low end data element, zero, and continues with step 728 plus width 954, and leftArrowY[6] 1058 equal to sy 952 plus one half height 956. The polygon continues to point leftArrowX[7] 1056 equal to sx 950 plus one half of width 954, and leftArrowY[7] 1058 equal to sy 952.

The buildUpArrow method 918 of FIG. 9 is invoked to create an upward pointing arrow. The buildUpArrow method 918 has parameters (all of type int) including:

(1) sx 958;

(2) sy 960;

(3) width 962; and (4) height 964.

The buildUpArrow method 918 starts at point (sx 958, sy 960) drawing an eight sided polygon arrow of dimensions width 962 by height 964 for scrolling up to offscreen folders. The polygon begins at point upArrowX[0] 1028 equal to sx 958 plus one half of width 962, and up ArrowY[0] 1058 equal to sy 960. The polygon continues to point upArrowX[1] 1028 equal to sx 958 and upArrowY[1] 1030 equal to sy 960 plus one half of height 964. The polygon continues to point upArrowX[2] 1028 equal to sx 958 plus one third of width 962, and upArrowY[2] 1030 equal to sy 960 plus one half of height 964. The polygon continues to point upArrowX[3] 1028 equal to sx 958 plus one third width 962, and upArrowY[3] 1030 equal to sy 960 plus two thirds height 964. The polygon continues to point upArrowX[4] 1028 equal to sx 958 plus two thirds of width 962, and upArrowY[4] 1030 equal to sy 960 plus height 964. The polygon continues to point upArrowX[5] 1028 equal to sx 958 plus two thirds of width 962, and upArrowY[5] 1030 equal to sy 960 plus one half of height 964. The polygon continues to point upArrowX[6] 1028 equal to sx 958 plus width 962, and upArrowY[6] 1030 equal to sy 960 plus one half height 964. The polygon continues to point upArrowX[7] 1028 equal to sx 958 plus one half of width 962, and upArrowY[7] 1030 equal to sy 960.

The buildRightArrow method 920 of FIG. 9 is invoked to build a scroll right arrow which points left. The buildRightArrow method 920 has parameters (all of type int) including:

(1) sx 966;

(2) sy 968

(3) width 970;

(4) and height 972,

The buildRightArrow method 920 starts at point (sx 966, sy 968) drawing a left pointing eight sided polygon arrow of dimensions width by height for scrolling right to offscreen folders or next pages. The polygon begins at point rightArrowX[0] 1022 equal to sx 966 plus one half of width 970, and rightArrowY[0] 1024 equal to sy 968. The polygon continues to point rightArrowX[1] 1022 equal to sx 966 plus one half of width 970, and rightArrowY[1] 1024 equal to sy 968 plus one third of height 972. The polygon continues to point rightArrowX[2] 1022 equal to sx 966 plus width 972, and rightArrowY[2] 1024 equal to sy 968 plus one third of height 972. The polygon continues to point rightArrowX[3] 1022 equal to sx 966 plus width 970, and rightArrowY[3] 1024 equal to sy 968 plus two thirds height 972. The polygon continues to point rightArrowX[4] 1022 equal to sx 966 plus one half of width 970, and rightArrowY[4] 1024 equal to sy 968 plus two thirds height 972. The polygon continues to point rightArrowX[5] 1022 equal to sx 966 plus one half of width 970, and rightArrowY[5] 1024 equal to sy 968 plus height 972. The polygon continues to point rightArrowX[6] 1022 equal to sx 966, and leftArrowY[6] 1024 equal to sy 968 plus one half height 972. The polygon continues to point rightArrowX[7] 1022 equal to sx 966 plus one half of width 970, and rightArrowY[7] 1024 equal to sy 968.

The update method 934 of FIG. 9 having parameter g of type Graphics, when invoked overloads the update function to avoid flicker by painting g.

The selectpage method 936 of FIG. 9 having parameter page of type int. When invoked, selectpage method 936 allows selection of pages programmatically starting with page zero. The selectpage method 936 checks if the size of folders 1036 is greater than the value of page, and if so then sets currentTab 1006 equal to page, sets folderTab 1054 equal to zero, repaints, and returns; if not so then the method returns.

Figure 11:
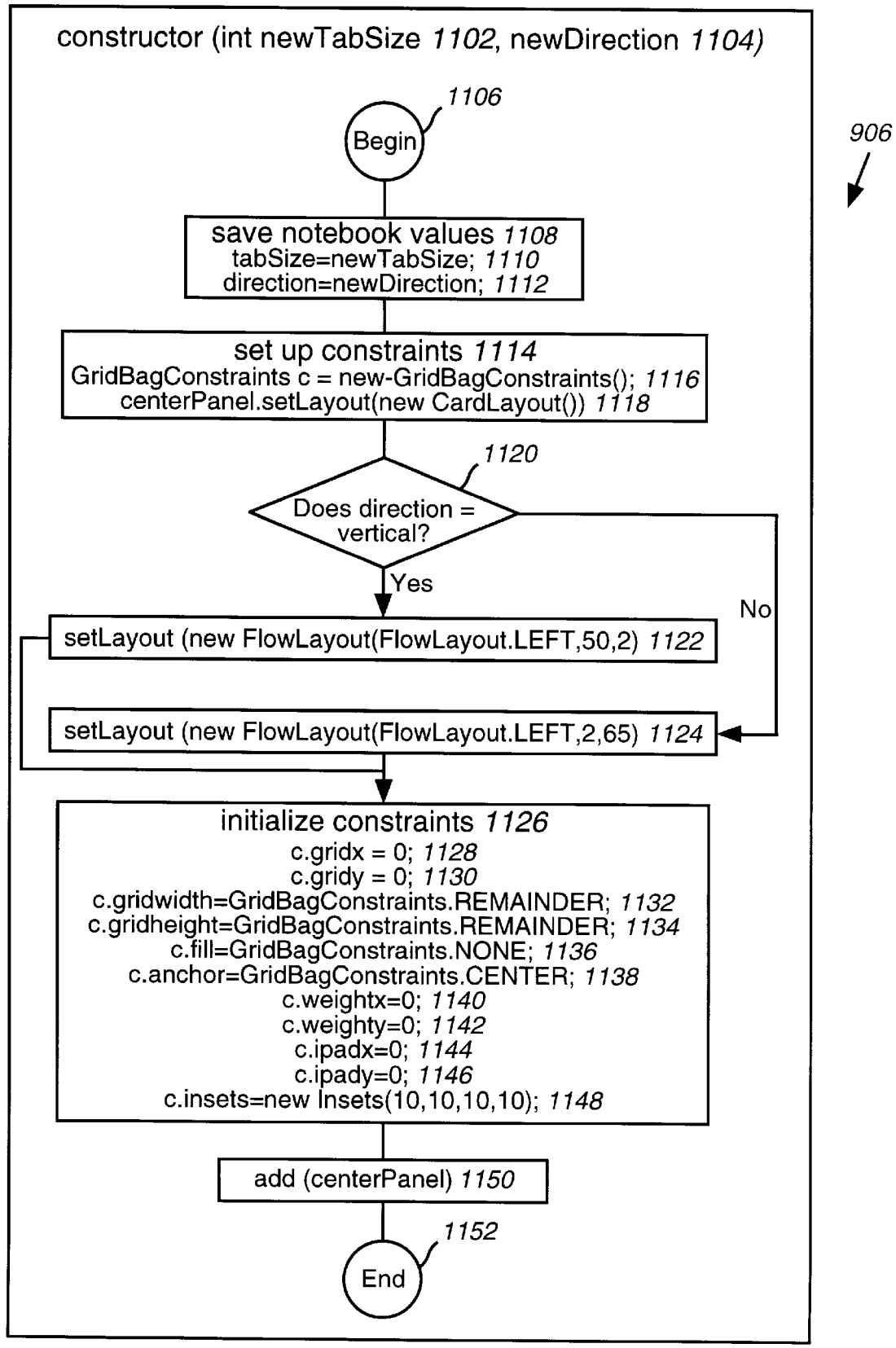
FIG. 11 is a flow diagram of the Notebook Constructor method.

FIG. 11 illustrates a flow chart representing the operation of Notebook constructor 906 which initializes the variables of the object created by instantiating the class. Notebook constructor 906 has parameters of type and name including:

(1) int newTabSize 1102; and
(2) int newDirection 1104.

Step 1106 begins Notebook constructor 906 which immediately continues with step 1108 which saves notebook values including step 1110 which sets tabSize 1026 equal to newTabSize 1102, sets direction 1112 equal to newDirection 1104, and continues execution with step 1114. Step 1114 of Notebook constructor 906 sets up constraints, including step 1116 which sets GridBagConstraints c (see step 1126 below) set equal to new GridBagConstraints( ), and step 1118 which sets layout of centerPanel 1032 to new CardLayout( ), and then execution continues with step 1120. Step 1120 of Notebook constructor 906 checks if direction 1008 is set to vertical, if so then step 1122 sets Layout to new FlowLayout for vertical orientation and execution continues with step 1126; if not then step 1124 sets layout to new FlowLayout for horizontal orientation and execution continues with step 1126. Step 1126 of Notebook constructor 906 initializes constraints including, c.gridx 1128 set to zero, c.gridy 1130 set to zero, c.gridwidth 1132 set to GridbagConstraints.REMAINDER, c.gridheight 1134 set to GridBagConstraints.REMAINDER, c.fill 1136 set to GridBagConstraints.NONE, c.anchor 1138 set to GridBagConstraints.CENTER, c.weightx 1140 set to zero, c.weighty 1142 set to zero, c. ipadx 1144 set to zero, c.ipady 1146 set to zero, and c.insets 1148 set to new lnsets(10,10, 10,10), and execution continues with step 1150. Step 1150 of Notebook constructor 906 adds centerPanel 1032, and ends with step 1152.

Figure 12:
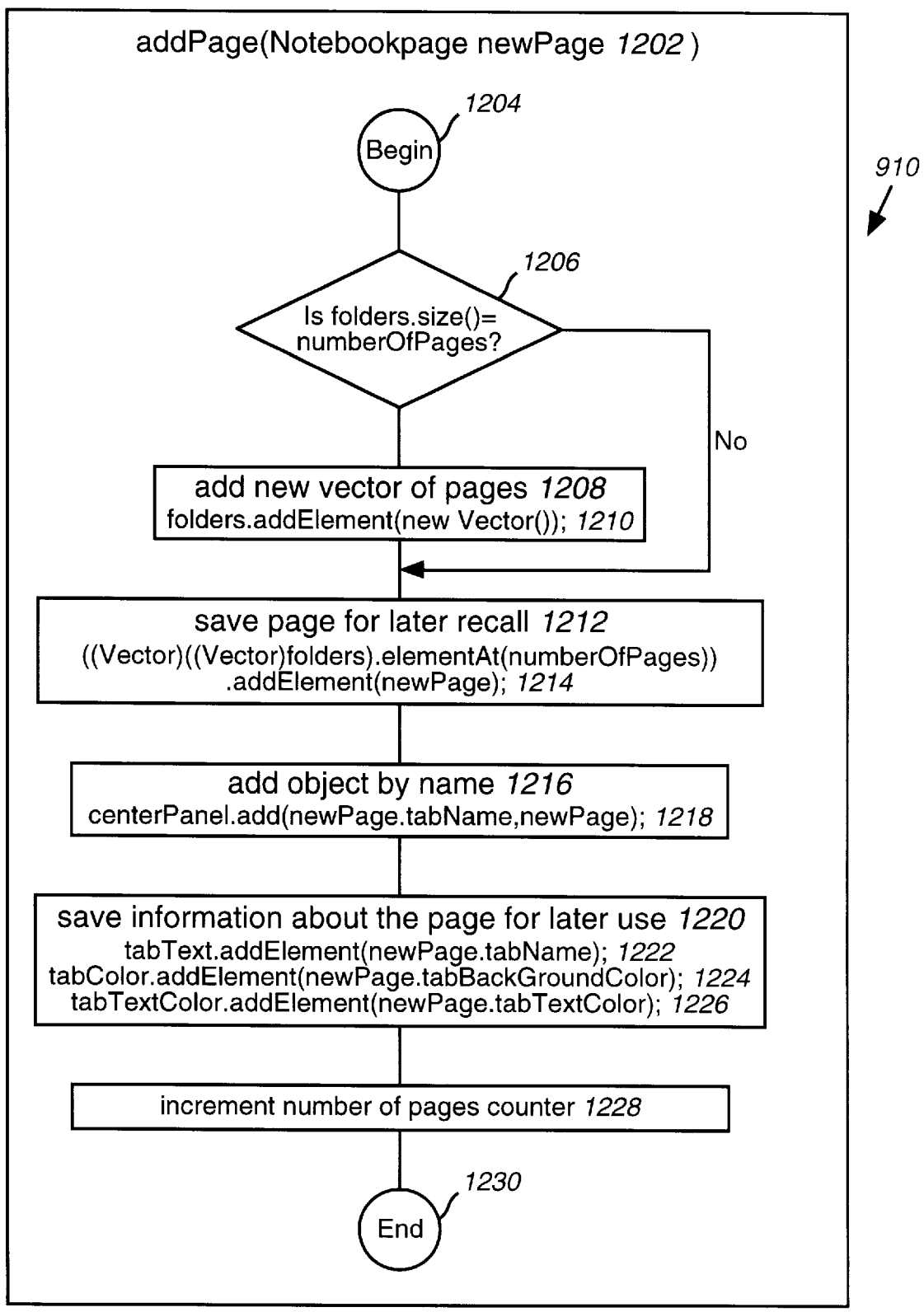
FIG. 12 is a flow diagram of the addPage method.

FIG. 12 illustrates a flow chart representing the operation of an addPage method 910 which when invoked adds a notebook page to the page vector. The addPage method 910 has parameter of type Notebookpage and name newPage 1202. The addpage method 910 begins with step 1204 which immediately continues to step 1206 which checks if size of folders 1036 is equal to numberOfPages 1016, if so then addpage method 910 continues to step 1208; if not then addPage method 910 continues to step 1212. Step 1208 adds a new vector of pages by processing step 1210, which adds new Vector( ) to folders 1036. Step 1212 of addPage method 910 saves page for later recall by processing step 1214 which adds elements of newPage 1204 to the vector of element of numberOfPages 1016 of vector folders 1036. Execution continues with step 1216. Step 1216 of addPage method 910 adds an object by name by executing step 1218 which adds centerPanel 1032 of NotebookPage newPage 1202 of name tabName 502, and continues with step 1220. Step 1220 of addPage method 910 saves information about the page for later use by first executing step 1222 which adds element tabName 502 of newpage 1202 to tabText 1044, second executing step 1224 which adds element tabBackGroundColor 504 of newPage 1202 to tabColor 1040, third executing step 1226 which adds element tabTextColor 506 of newPage 1202 to tabTextColor 1042, and continuing with step 1228. Finally, step 1228 of addPage method 910 increments numberOfPages 1016 counter. Method newPage ends with step 1230.

Figure 13:
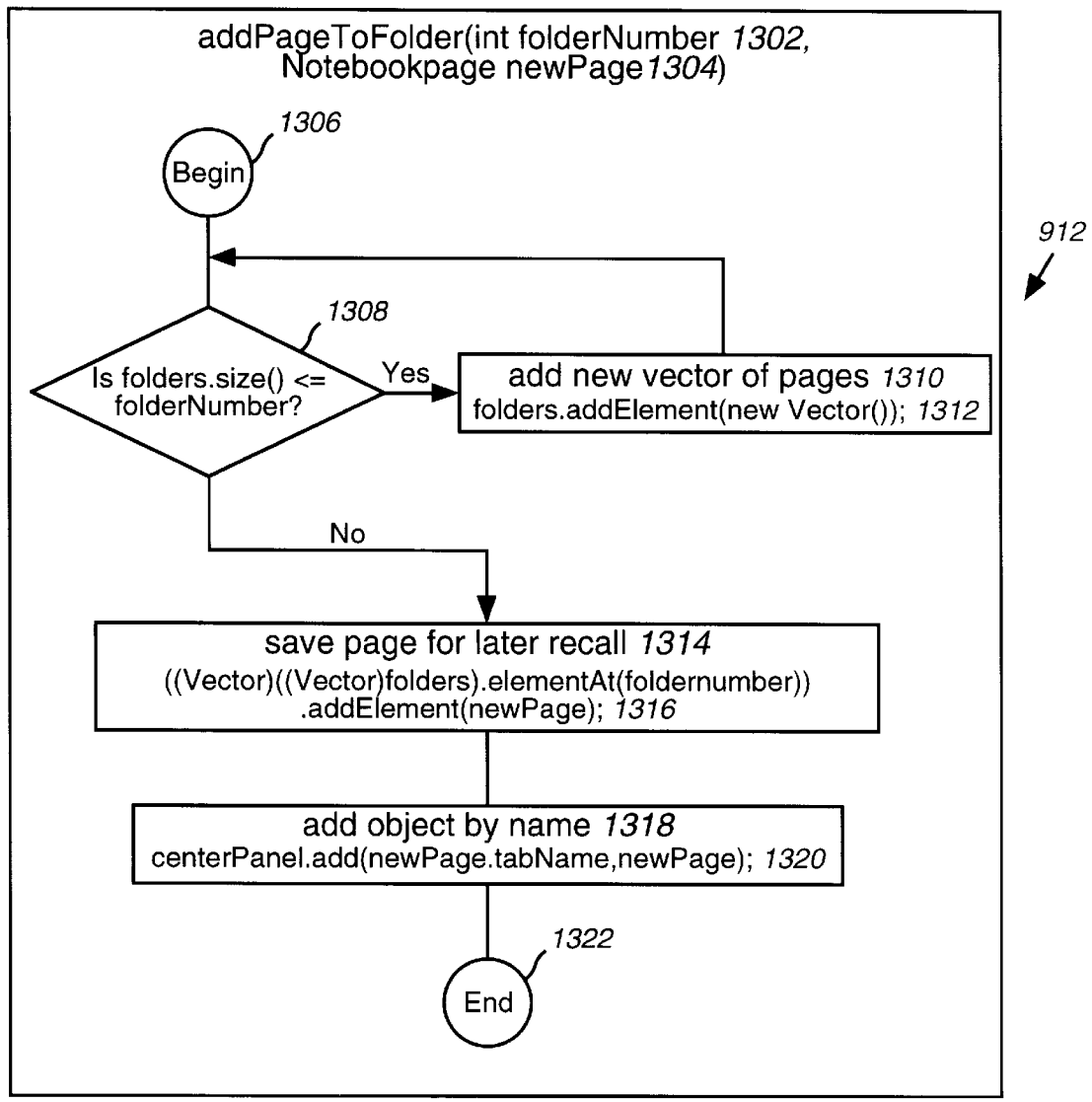
FIG. 13 is a flow diagram of the addPageToFolder method.

FIG. 13 illustrates a flow chart representing the operation of addPageToFolder method 912 which when invoked adds another page to a folder. The addPageToFolder method 912 has parameters of type and name including, int folderNumber 1302 and Notebookpage newPage 1304. The addPageToFolder method 912 begins with step 1306 which immediately continues with step 1308 which checks if the size of folders 1036 is less than or equal to folderNumber 1302, if so then step 1310 is executed; if not then execution continues with step 1314. Step 1310 adds a new vector of pages to the folder by executing step 1312 which adds new Vector( ) element to folders 1036 and then returns to step 1308. Step 1314 of addPageToFolder method 912 saves the page for later recall by executing step 1316 which adds element newPage 1304 to the folders 1036 element at foldernumber 1302. Step 1318 of addPageToFolder method 912 adds object by name by executing step 1320 which adds newPage 1304 of tabName 502 to centerPanel 1032 and continues immediately with step 1322 which represents the completion of the method.

Figure 14:
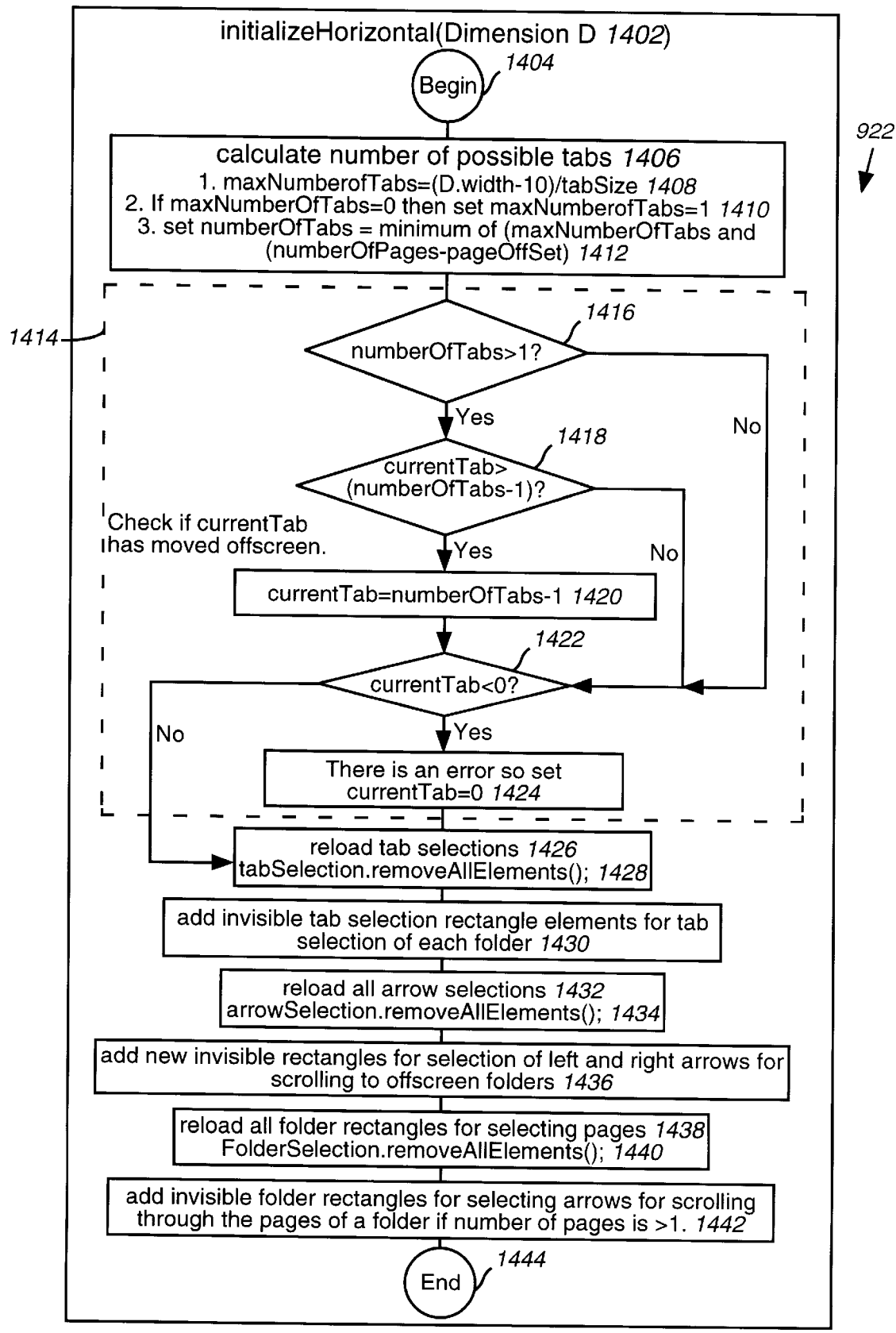
FIG. 14 is a flow diagram of the initializeHorizontal method.

FIG. 14 illustrates a flow chart representing the operation of initializeHorizontal method 922 which when invoked initializes data to display a horizontal notebook. The initializeHorizontal method 922 includes parameter of type and name, Dimension D 1402. The initializeHorizontal method 922 begins with step 1404 which immediately continues with step 1406. Step 1406 calculates the number of possible tabs by first executing step 1408 which sets maxNumberofTabs 1014 equal to quotient of the quantity width of D 1402 less ten and tabSize 1026; second executing step 1410 which sets maxNumberofTabs 1014 to one if maxNumberofTabs 1014 is equal to zero; third executing step 1412 which sets numberOfTabs 1018 equal to minimum of maxNumberOfTabs 1014 and quantity of the difference between numberOfPages 1016 and pageOffSet 1020; and fourth continuing with step 1414. Step 1414 of initializeHorizontal method 922 checks if currentTab 1006 has moved offscreen. Step 1414 includes steps 1416 through 1424. Step 1416 checks if numberOfTabs 1018 is greater than one, if so then execution continues with step 1418; if not so then execution branches to the step 1422. Step 1418 of initializeHorizontal method 922 checks whether currentTab 1006 is greater than quantity numberOfTabs 1018 less one, if so then execution continues with step 1420; if not then execution branches to step 1422. Step 1420 sets currentTab 1006 equal to numberOfTabs 1018 less one, and continues with step 1422. Step 1422 checks whether currentTab 1006 is less than zero, if so then execution continues with step 1424; if not then execution continues with step 1426. Step 1424 sets currentTab 1006 equal to zero since there was an error, i.e.currentTab 1006 should not be negative. Execution continues with step 1426. Step 1426 of initializeHorizontal method 922 reloads tabSelection 1046 by executing step 1428 which removes all elements of tabSelection 1046 and then executes step 1430. Step 1430 adds invisible tabSelection 1046 rectangles 214 and 248 for tab selection of each folder, and continues with execution of step 1432. Step 1432 of initializeHorizontal method 922 reloads all arrowSelection 1034 elements by executing step 1434 which removes all elements of arrowSelection 1034, and continues with step 1436. Step 1436 adds new invisible arrowSelection 1034 rectangles 236 and 240 for arrow selection of left and right arrows, respectively, for scrolling to offscreen folders. Step 1438 of initializeHorizontal method 922 reloads all folder rectangles for selecting pages by executing step 1440 which removes all elements of folderSelection 1038 and continues with step 1442. Step 1442 adds invisible folderSelection 1038 rectangles 226 and 230 for selecting arrows for scrolling through the pages of a folder if numberOfPages 1016 is greater than one and then continues immediately with step 1444, which represents the completion of the method.

Figure 15:
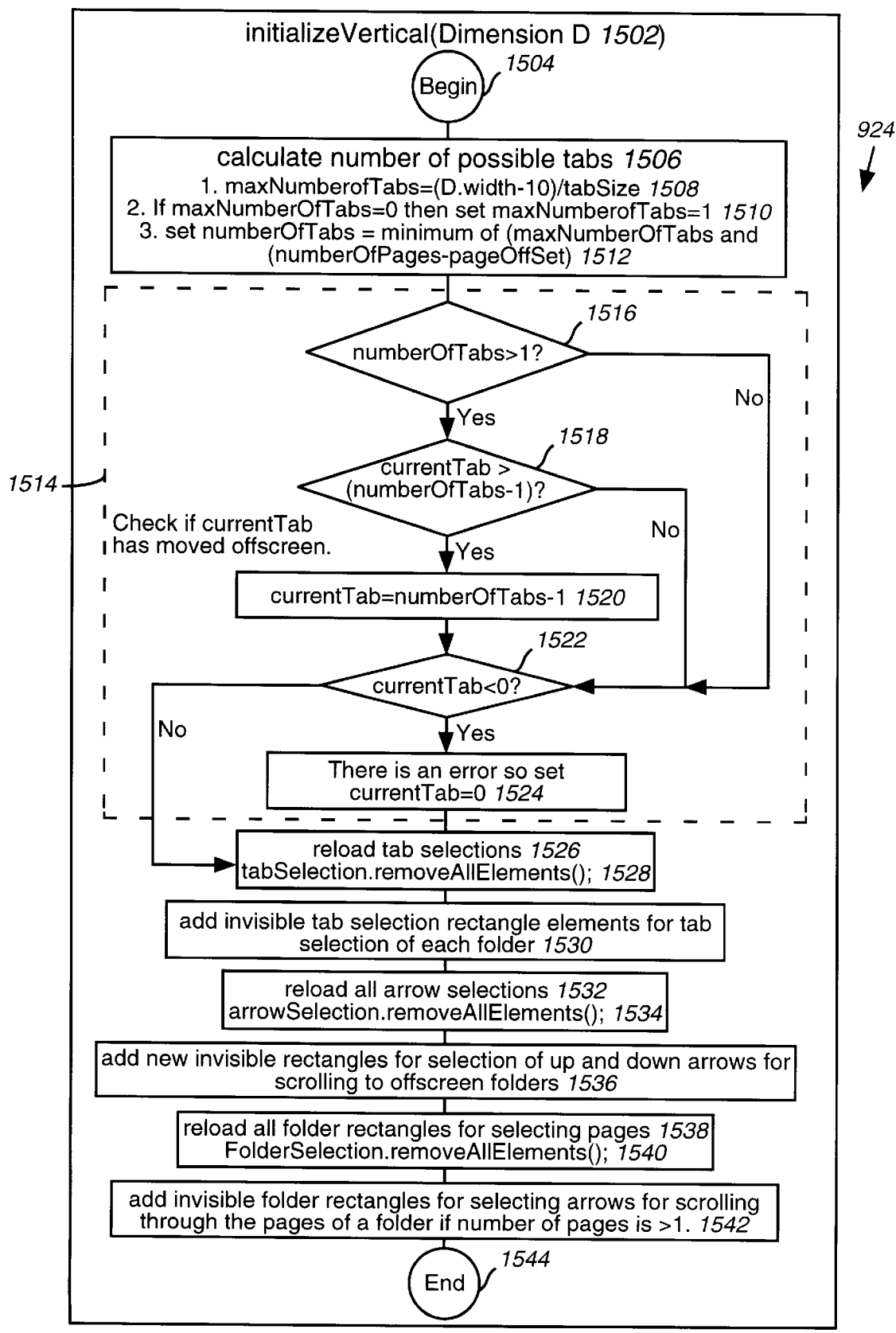
FIG. 15 is a flow diagram of the initializeVertical method.

FIG. 15 illustrates a flow chart that represents the operation of the initializeVertical method 924 which when invoked initializes data to display a vertical notebook. The initializeVertical method 924 includes parameter of type and name, Dimension D 1504. The initializeVertical method 924 begins with step 1504 which immediately continues with step 1506. Step 1506 calculates the number of possible tabs by first executing step 1508 which sets maxNumberofTabs 1014 equal to quotient of the quantity width of D 1502 less ten and tabSize 1026; second executing step 1510 which sets maxNumberofTabs 1014 to one if maxNumberofTabs 1014 is equal to zero; third executing step 1512 which sets numberOfTabs 1018 equal to minimum of maxNumberOfTabs 1014 and quantity of the difference between numberOfPages 1016 and pageOffSet 1020; and fourth continuing with step 1514. Step 1514 of initializeVertical method 924 checks if currentTab 1006 has moved offscreen. Step 1514 includes steps 1516 through 1524. Step 1516 checks if numberOfTabs 1018 is greater than one, if so then execution continues with step 1518; if not so then execution branches to the step 1522. Step 1518 of initializeVertical method 924 checks whether currentTab 1006 is greater than quantity numberOfTabs 1018 less one, if so then execution continues with step 1520; if not then execution branches to step 1522. Step 1520 sets currentTab 1006 equal to numberOfTabs 1018 less one, and continues with step 1522. Step 1522 checks whether currentTab 1006 is less than zero, if so then execution continues with step 1524; if not then execution continues with step 1526. Step 1524 identifies that there was an error since currentTab 1006 was negative, so step 1524 sets currentTab 1006 to zero and execution continues with step 1526. Step 1526 of initializeVertical method 924 reloads tabSelection 1046 by executing step 1528 which removes all elements of tabSelection 1046 and then executes step 1530. Step 1530 adds invisible tabSelection 1046 rectangles 314 and 348 for tab selection of each folder, and continues with execution of step 1532. Step 1532 of initializeVertical method 924 reloads all arrowSelection 1034 elements by executing step 1534 which removes all elements of arrowSelection 1034, and continues with step 1536. Step 1536 adds new invisible arrowSelection 1034 rectangles 336 and 340 for arrow selection of up and down arrows, respectively, for scrolling to offscreen folders. Step 1538 of initializeVertical method 924 reloads all folder rectangles for selecting pages by executing step 1540 which removes all elements of folderSelection 1038 and continues with step 1542. Step 1542 adds invisible folderSelection 1038 rectangles 326 and 330 for selecting arrows for scrolling through the pages of a folder if numberOfPages 1016 is greater than one and then continues immediately with step 1544 which represents the completion of the method.

Figure 16A:
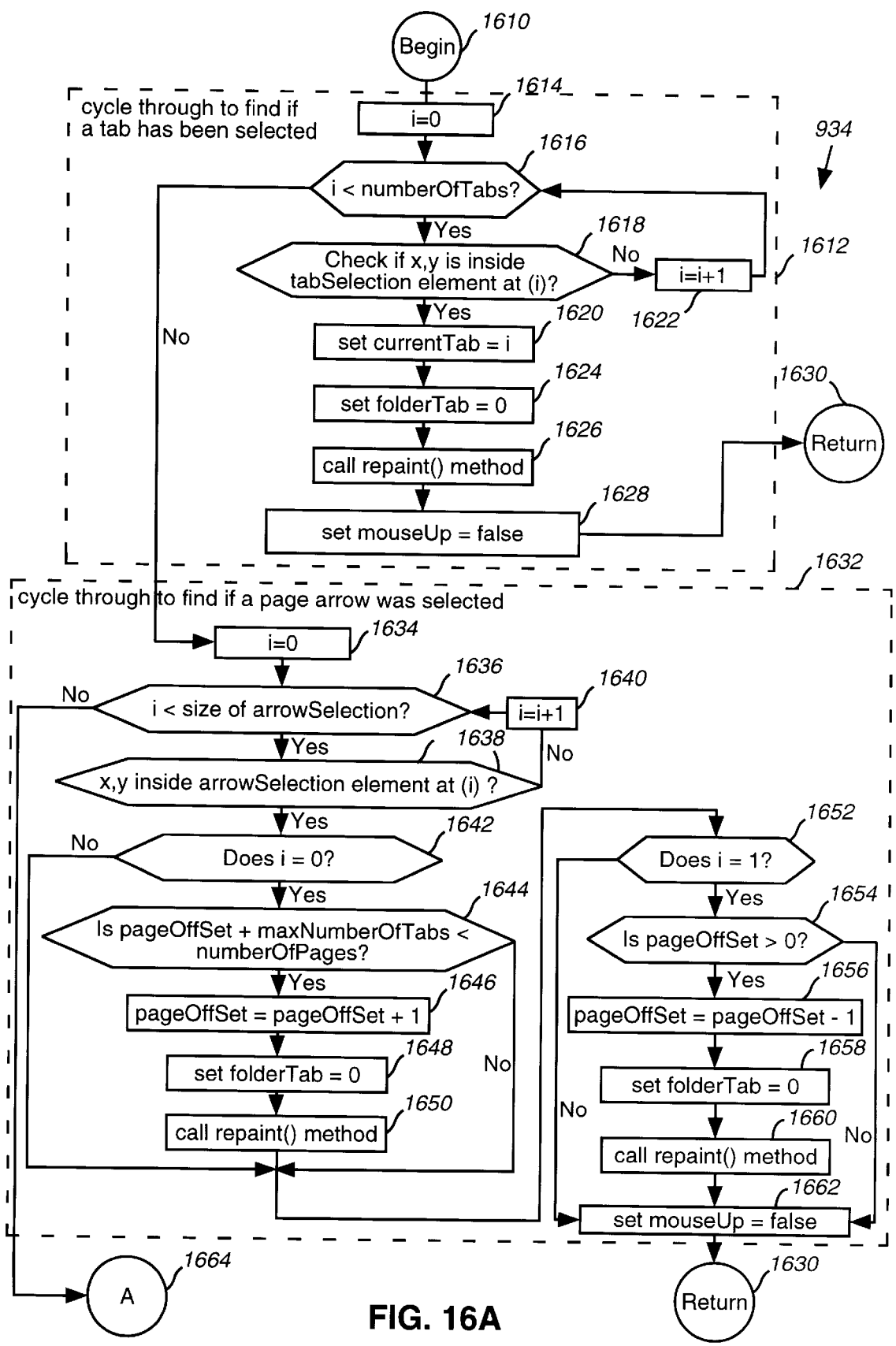
FIGS. 16a and 16b collectively depict a flow diagram of the mouseUp method.
Figure 16B:
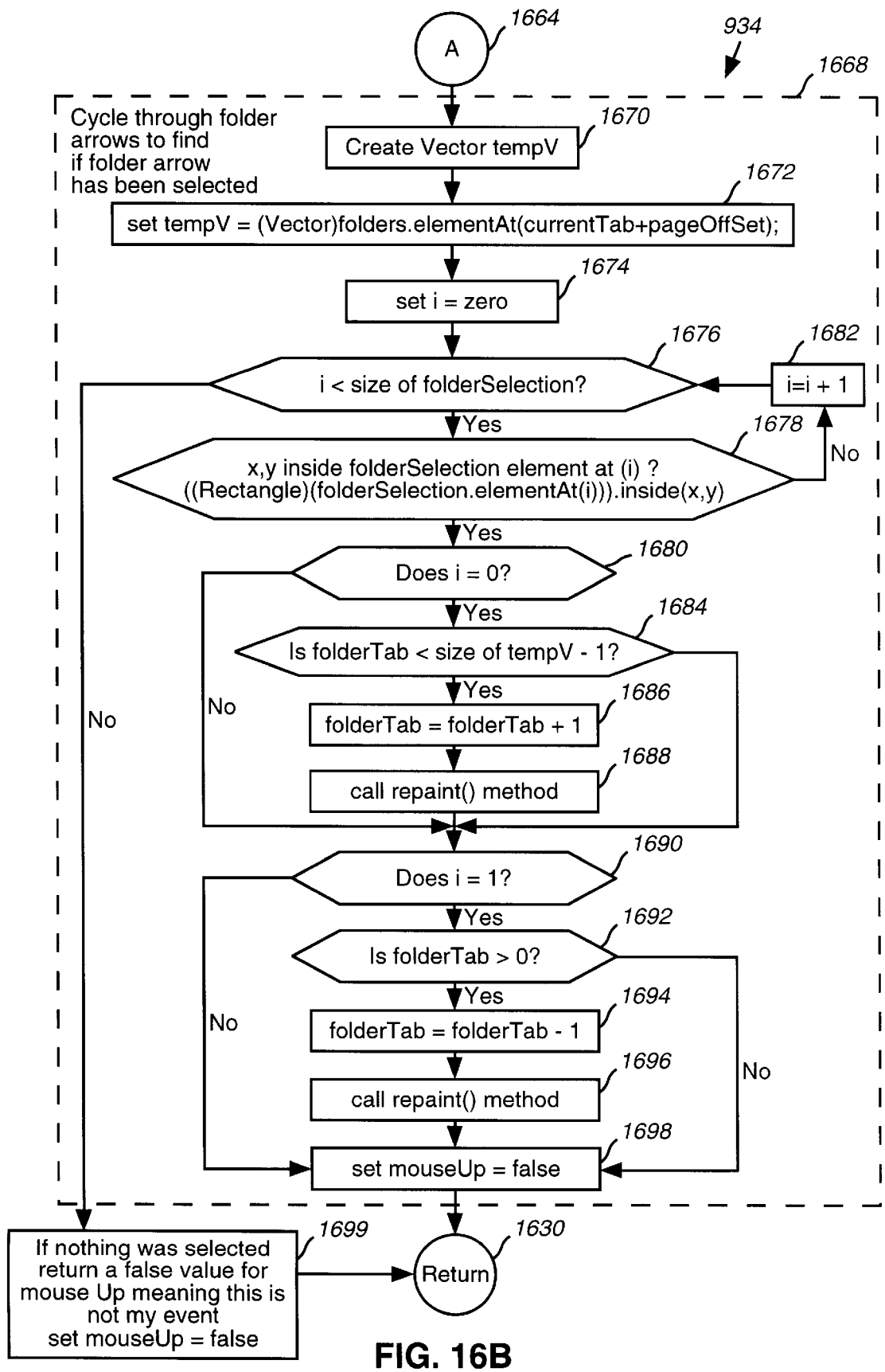

FIGS. 16A and 16B collectively illustrate a flow chart representing the operation of the mouseUp method 934 which when invoked handles mouse button events. The mouseUp method 934 returns a boolean value and has parameters of types and names including, Event evt 1604, int x 1606, int y 1608. The mouseUp method 934 begins with step 1610 which immediately continues to step 1612 which checks if a folder tab 210, 244, 310 or 344 has been selected by mouse 126 by executing steps 1614 through 1628. Step 1614 initializes counter i setting it equal to zero, and execution continues with step 1616. Step 1616 checks if I is less than numberOfTabs 1018 and if so continues with step 1618; and if not then execution continues with step 1632. Step 1618 checks if point (x 1606, y 1608) is within any tabSelection 1046 invisible tab rectangles 214, 248, 314 and 348, and if so then executes step 1620; and if not then executes step 1622. Step 1622 increments counter i and execution continues with step 1616. Step 1620 sets currentTab 1006 equal to i, and execution continues with step 1624. Step 1624 sets folderTab 1054 equal to zero, and continues with step 1626. Step 1626 calls repaint( ) method and execution continues with step 1628. Step 1628 sets the return value of mouseUp method 934 to false and immediately execution continues with step 1630 which represents completion of the method.

Step 1632 which executes steps 1634 through 1662, cycles through additional page selection arrows 222 and 322 checking whether any page arrows have been selected. Step 1634 initializes counter i to zero and execution continues with step 1636. Step 1636 checks if i is less than size of arrowSelection 1034, and if so then executes step 1638, and if not then execution continues with connector 1664. Step 1638 checks if point (x 1606, y 1608) is within arrowSelection 1034 invisible page selection rectangles 226 or 326, if so then executes step 1640; and if not then executes 1642. Step 1640 checks if i equals zero meaning page advance arrow 226 or 326 was selected, and if so then executes step 1644; and if not then executes step 1652. Step 1644 checks if the sum of pageOffSet 1020 and maxNumberOfTabs 1014 is less than numberOfPages 1016, and if so then executes 1646; and if not then executes step 1652. Step 1646 increments pageOffSet 1020 and executes step 1648. Step 1648 sets folderTab 1054 to zero and executes step 1650. Step 1650 calls repaint( ) method, and executes step 1652. Step 1652 checks if i equals 1, if so then executes step 1654, and if not then executes step 1662. Step 1654 checks if pageOffSet 1020 is greater than zero, if so then executes step 1656, and if not then executes step 1662. Step 1656 decrements pageOffSet 1020 and executes step 1658. Step 1658 sets folderTab 1054 equal to zero and executes step 1660. Step 1660 calls repaint( ) method and immediately executes step 1662. Step 1662 sets the value of mouseUp method 934 to false and immediately executes step 1630 which represents the completion of the method. Connector 1664 connects FIG. 16a to FIG. 16b.

FIG. 16b begins with connector 1664 which immediately executes step 1668. Step 1668 checks if an offscreen folder selection arrow 232 or 332 has been selected by cycling through folderSelection 1038 offscreen folder arrow elements including steps 1670 through step 1698. Step 1670 creates vector tempV and executes step 1672. Step 1672 sets tempV equal to folders 1036 element at position sum of currrentTab 1006 and pageOffSet 1020, and executes step 1674. Step 1674 sets counter i equal to zero and executes step 1676. Step 1676 checks if i is less than size of folderSelection 1038 and executes step 1678. Step 1678 checks if point (x 1606, y 1608) is within invisible scroll to offscreen folderSelection 1038 rectangles 236, 240, 336 or 340, if so executes step 1680 and if not then executes step 1682. Step 1680 checks if i equals zero, if so then executes step 1684, and if not then executes step 1690. Step 1684 checks if folderTab 1054 is less than difference between size of tempV and one, if so then executes step 1686, and if not then executes step 1690. Step 1686 increments folderTab and executes step 1688. Step 1688 calls repaint( ) method and executes step 1690. Step 1690 checks if i equals one, which means second scroll to offscreen folderSelection 1038 is selected, if so then executes step 1692, and if not then executes step 1698. Step 1692 checks if folderTab is greater than zero, if so then executes step 1694, and if not then executes step 1698. Step 1694 increments folderTab 1054 and executes step 16%. Step 1696 calls repaint( ) method and executes step 1698. Step 1698 sets mouseUp method 934 false and immediately executes step 1630 which returns. Step 1699 is reached if no offscreen folderSelection 1038 rectangles were selected. Step 1699 sets mouseUp method 934 false and immediately executes step 1630 which represents the completion of the method.

Figure 17:
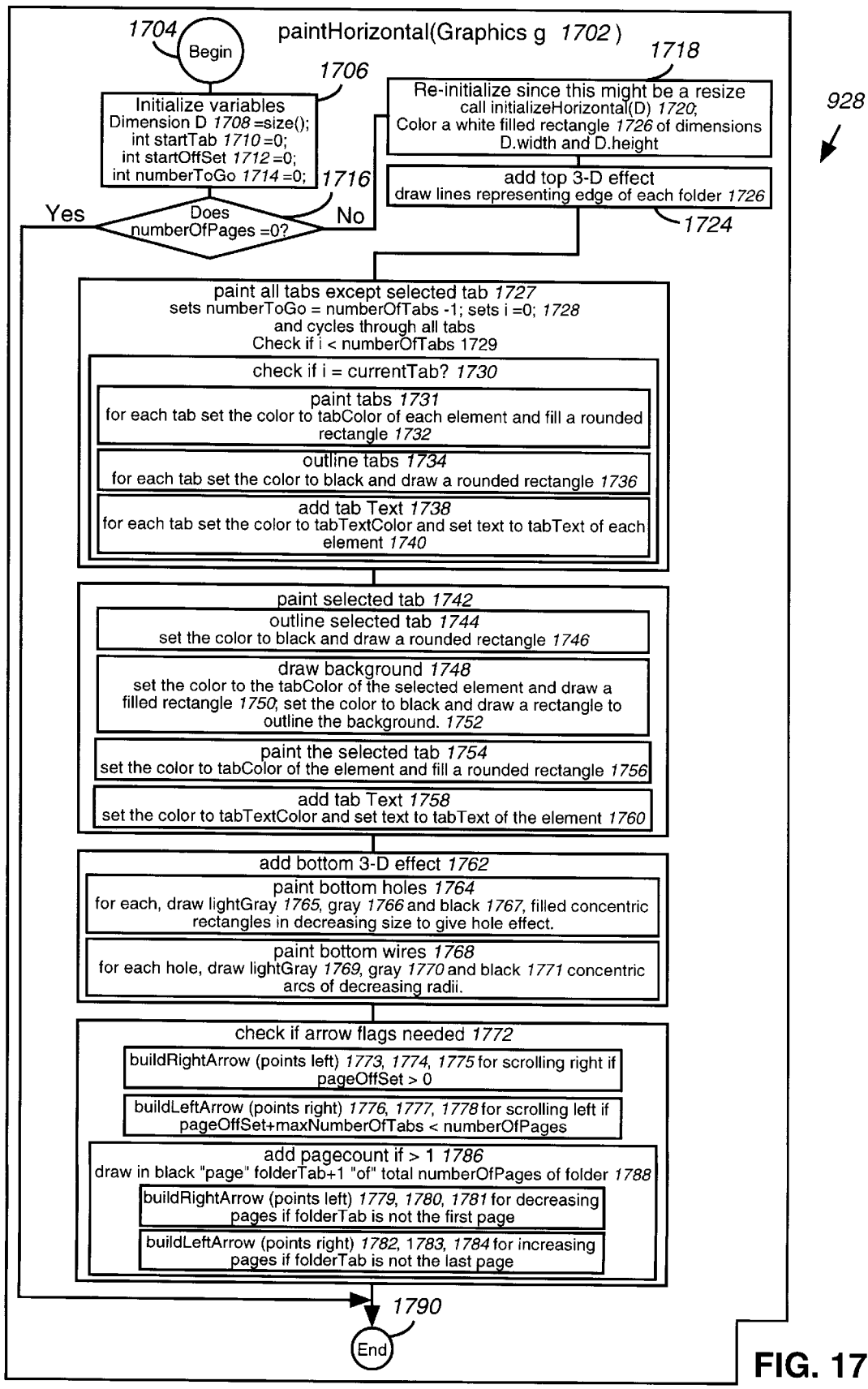
FIG. 17 is a flow diagram of the paintHorizontal method.

FIG. 17 illustrates a flow chart representing the operation of paintHorizontal method 928 which when invoked paints the graphics for a horizontal notebook. The paintHorizontal method 928 has paintHorizontal method parameter of type Graphics and name g 1702. The painthorizontal method 928 begins with step 1704 and immediately continues with step 1706 which initializes paintHorizontal variables of type and name including, Dimension D 1708 set equal to size( ), int startTab 1710 set equal to zero, int startOffSet 1712 set equal to zero, and int numberToGo 1714 set equal to zero, and execution continues with step 1716. Step 1716 of paintHorizontal method 928 checks if numberOfPages 1016 equals zero and if so executes step 1790, and if not then executes step 1718. Step 1718 of paintHorizontal method 928 re-initializes since this might be a resize and executes steps 1720 and 1722. Step 1720 calls initializeHorizontal( ) method 922 on parameter D 1708 and executes step 1722. Step 1722 sets color to white and draws a filled rectangle starting at point (0,0) of dimensions width and height of D 1708 and executes step 1724.

Step 1724 of paintHorizontal method 928 adds top 3-D effect 250 and executes step 1726. Step 1726 draws top 3-D effect 250 by a three step process which draws lines representing edges of each folder. The first step sets numberToGo 1714 to numberOfTabs 1018 less one, and sets integer counter i to zero. The second step of step 1726 sets startOffSet 1712 equal to product of numberToGo 1714 and two, draws a lightGray line starting at point (0, 25 plus startOffSet 1712) and ending at point (D.width 1708, 25 plus startOffSet 1712) and by drawing a black line starting at point (0, 25 plus startOffSet 1712 less one) ending at point (D.width 1708, 25 plus startOffSet 1712 less one). The third step of 1726 decrements numberToGo 1714, increments counter i, checks if i is less than numberOfTabs 1018 less one, and if so then executes second step of 1726, and if not then executes step 1727.

Step 1727 of paintHorizontal method 928 paints all tabs 242 except selected tab 210 by executing steps 1728 through 1740. Step 1728 sets numberToGo 1714 equal to numberOfTabs 1018 less one, initializes integer counter i to zero, and executes step 1729. Step 1729 checks if i is less then numberOfTabs 1018 and if so then executes step 1730, and if not then executes step 1742. Step 1730 checks that i is not equal to currentTab 1006, and if so then executes step 1731, and if not then increments i and executes step 1729. Step 1731 paints nonselected tabs. Step 1731 sets startOffSet 1712 equal to product of two and numberToGo 1714, sets startTab 1710 to sum of ten and product of i and tabSize 1026, and then executes step 1732. Step 1732 sets color to tabColor 1040 of element (i plus pageOffSet 1020) and draws a filled rounded rectangle starting at point (startTab 1710, startOffSet 1712) of width tabSize 1026, height 25, arc width 25, and arc height 25, and then executes step 1734. Step 1734 outlines nonselected tabs by executing step 1736. Step 1736 sets color to black and draws rounded rectangle starting at point (startTab 1710, startOffSet 1712) of width tabSize 1026, height twenty-five, arc width 25 and arc height 25, and executes step 1738. Step 1738 adds tab text to nonselected tab by executing step 1740. Step 1740 sets color to tabTextColor 1042 element at position sum of i and pageOffSet 1020, and draws nonselected text string of tabText 1044 element at position (startTab 1710 plus 10, startOffSet 1712 plus 15), decrements numberToGo 1714, increments i, and executes step 1729. This step ensures that the text will always be in the center of the tab.

Step 1742 of paintHorizontal method 928 paints selected tab 210. Step 1742 sets startTab 1710 equal to sum of ten and the product of currentTab 1006 and tabSize 1026, and executes steps 1744 through 1760. Step 1744 outlines selected tab which executes step 1746. Step 1746 sets color to black and draws a rounded rectangle at point (startTab 1710, product of two and numberOfTabs 1018) of width tabSize 1026, height 25, arc width 25 and arc height 25, and executes step 1748. Step 1748 draws background which sets startOffSet 1712 to product of two and numberOfTabs 1018, sets color to tabColor 1040 of element at sum of currentTab 1006 and pageOffSet 1020, and executes step 1750. Step 1750 draws a filled rectangle starting at point (0, sum of 24 and startOffSet 1712) of width D.width 1708 and height of D.height 1708 less 31 less startOffSet 1712 and executes step 1752. Step 1752 sets color to black and draws a rectangle to outline the background starting at point (0, difference between 24 and startOffSet 1712) of width D.width 1708 less one, and height D.height 1708 less the 31 less startOffSet 1712, and executes step 1754. Step 1754 paints selected tab 210 by executing step 1756. Step 1756 sets color to tabColor 1040 of element at sum of currentTab 1006 and pageOffSet 1020, and draws a filled rounded rectangle at point (startTab 1710 plus one, sum of one and product of two and numberOffabs 1018) of width tabSize 1026 less one, height 25 less one, arc width 25 and arc height 25, and executes step 1758. Step 1758 adds tab text to selected tab 210 by executing step 1760. Step 1760 sets color to tabTextColor 1042 element at sum of currentTab 1006 and pageOffSet 1020, draws text string tabText 1044 of element at sum of currentTab 1006 and pageOffSet 1020, at point (startTab 1710 plus 10, product of numberOfTabs 1006 and 2 (this product is to compensate for the 3D effect, since each tab is 2 pixels higher than the previous), and executes step 1762.

Step 1762 of paintHorizontal method 928 adds bottom 3-D effect 252 by executing steps 1764 through 1771. Step 1764 paints bottom holes 254. Step 1764 paints increasingly dark filled concentric rectangles in decreasing size to give hole effect by initializing integer counter i set to eight, and executes step 1765. Step 1765 sets color to lightGray and draws a filled rectangle at point (i, D.height 1708 less 23) of width 10 and height 10, and executes step 1766. Step 1766 sets color to gray and draws filled rectangle at point (i plus one, D.height 1708 less 22) of width 9 and height 9 and executes step 1767. Step 1767 sets color to black and draws filled rectangle at point ( i plus two, D.height 1708 less 21) of width 8 and height 8, increments counter i by 15 and checks if i is less than D.width 1708 less 25, if so then executes step 1765, if not then executes step 1768.

Step 1768 paints bottom wires 256. Step 1768 initializes integer counter i set to eight, and executes steps 1769 through 1771 which draw multiple colored concentric arcs of decreasing radii. Step 1769 sets color to lightGray and draws an arc at point (i plus two, d.height 1708 less 21) of width 15, height 15, start angle 245 and arc angle 270, and executes step 1770. Step 1770 sets color to gray and draws an arc at point (i plus two, d.height 1708 less 20) of width 15, height 15, start angle 245 and arc angle 270 and executes step 1771. Step 1771 sets color to black and draws an arc at point (i plus two, d.height 1708 less 19) of width 15, height 15, start angle 245 and arc angle 270, and increments counter i by 15 checks whether i is less than D.width 1708 less 25, and if so then executes step 1769, and if not then executes step 1772.

Step 1772 of paintHorizontal method 928 checks if arrow flags are needed by executing steps 1774 through 1780. Step 1772 checks if scroll right folder selection arrow 238 is needed by checking if pageoffset 1020 is greater than zero, and if so then executes steps 1773 through 1775 to make three different colored right folder selection arrow 238 for scrolling right; and if not then executes step 1776. Step 1773 sets color to black and calls buildRightArrow method 920 which draws at point (D.width 1708 less 37, 27 plus the product of 2 and numberOfTabs 1018 ) a filled eight sided polygon described by vectors rightArrowX 1022 and rightArrowY 1024 of width 30 and height 21, and executes step 1774. Step 1774 sets color to gray and calls buildRightArrow method 920 to draw at point (D.width 1708 less 36, 26 plus the product of 2 and numberOfTabs 1018 ) a filled eight sided polygon described by vectors rightArrowX 1022 and rightArrowY 1024 of width 30 and height 21, and executes step 1775. Step 1775 sets color to white and calls buildRightArrow method 920 to draw at point (D.width 1708 less 35, 27 plus the product of 2 and numberOfTabs 1018 ) a filled eight sided polygon described by vectors rightArrowX 1022 and rightArrowY 1024 of width 30 and height 21, and executes step 1776.

Step 1776 checks whether a scroll left folder selection arrow 234 is needed, by checking if pageOffSet 1020 plus maxNumberOfTabs 1014 is less than numberOfPages 1016, and if not then executes step 1786; and if so then sets color to black and calls buildLeftArrow method 916 to draw at point (7, 27 plus product of 2 and numberOfTabs 1018 ) a filled eight sided polygon described by vectors leftArrowX 1056 and leftArrowY 1058 of width 30 and height 21 which draws a scroll left folder selection arrow 234, and executes step 1777. Step 1777 sets color to gray and calls buildLeftArrow method 916 to draw at point (6, 26 plus the product of 2 and numberOfTabs 1018 ) a filled eight sided polygon described by vectors leftArrowX 1056 and leftArrowY 1058 of width 30 and height 21, and executes step 1778. Step 1778 sets color to white and calls buildLeftArrow method 916 to draw at point (5, 25 plus the product of 2 and numberOfTabs 1018 ) a filled eight sided polygon described by vectors leftArrowX 1056 and leftArrowY 1058 of width 30 and height 21 and executes step 1786.

Step 1786 of paintHorizontal method 928 adds a page count if necessary. Step 1786 initializes vector tempV, sets tempV equal to vector folders 1036 element at the position of sum of currentTab 1006 and pageOffSet 1020. Step 1786 also checks if the size of tempV is greater than one, if so then it executes step 1788, if not then it executes step 1790. Step 1788 sets color to black, draws string of text "page", number folderTab 1054 plus one, text "of", number size of tempV, at point (D.width 1708 less 100, D.height 1708 less 50 (this takes into account the width of the wires)), and executes step 1779. This step centers the current folder on the page.

Step 1779 determines if decrement page selection arrow 228 is needed (when current page is not the first page) by checking if folderTab 1054 is not equal to zero, and if not so then executes step 1782; and if so then sets color to black and calls buildRightArrow method 920 to draw at point (D.width 1708 less 100, D.height 1708 less 45) a filled eight sided polygon described by vectors rightArrowX 1022 and rightArrowY 1024 of width 30 and height 21, and executes step 1780.

Step 1780 sets color to gray and calls buildRightArrow method 920 which draws at point (D.width 1708 less 99, D.height 1708 less 46) a filled eight sided polygon described by vectors rightArrowX 1022 and rightArrowY 1024 of width 30 and height 21, and executes step 1781. Step 1781 sets color to white and calls buildRightArrow method 920 to draw at point (D.width 1708 less 98, D.height 1708 less 47) a filled eight sided polygon described by vectors rightArrowX 1022 and rightArrowY 1024 of width 30 and height 21, and executes step 1782.

Step 1782 checks whether advance page selection arrow 224 is needed (if folderTab 1054 is not the last page) by checking if folderTab 1054 is not equal to size of tempV less one, and if not then executes step 1790; and if so then sets color to black and calls buildLeftArrow method 916 to draw at point (D.width 1708 less 68, D.height 1708 less 45) a filled eight sided polygon described by vectors leftArrowX 1056 and leftArrowY 1058 of width 30 and height 21 and executes step 1783. Step 1783 sets color to gray and calls buildLeftArrow method 916 to draw at point (D.width 1708 less 69, D.height 1708 less 46) a filled eight sided polygon described by vectors leftArrowX 1056 and leftArrowY 1058 of width 30 and height 21, and executes step 1784. Step 1784 sets color to white and calls buildLeftArrow method 916 to draw at point (D.width 1708 less 70, D.height 1708 less 47) a filled eight sided polygon described by vectors leftArrowX 1056 and leftArrowY 1058 of width 30 and height 21, and executes step 1790. Step 1790 represents the completion of paintHorizontal method 928.

Figure 18:
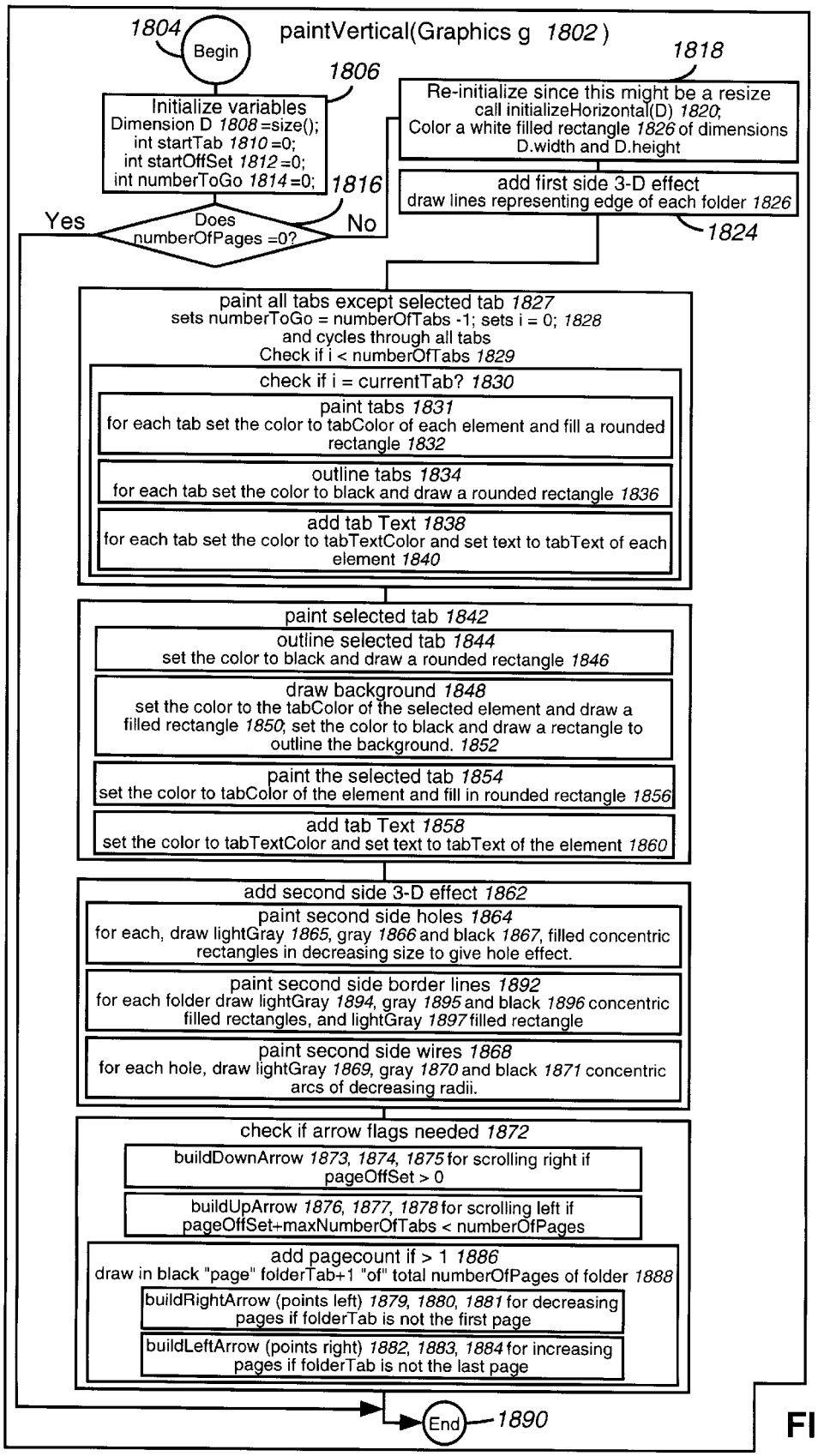
FIG. 18 is a flow diagram of the paintVertical method.

FIG. 18 illustrates a flow chart representing the operation of paintVertical method 930 which when invoked paints the graphics for a vertical notebook. The paintVertical method 930 has parameter of type Graphics and name g 1802. The paintVertical method 930 begins with step 1804 and immediately continues with step 1806 which initializes paintVertical variables of type and name including, Dimension D 1808 set equal to size( ), int startTab 1810 set equal to zero, int startOffSet 1812 set equal to zero, and int numberToGo 1814 set equal to zero, and execution continues with step 1816. Step 1816 of paintVertical method 930 checks if numberOfPages 1016 equals zero and if so executes step 1890, and if not then executes step 1818. Step 1818 of paintVertical method 930 re-initializes since this might be a resize and executes steps 1820 and 1822. Step 1820 calls initializeVertical( ) method 924 on parameter D 1808 and executes step 1822. Step 1822 sets color to white and draws a filled rectangle starting at point (0,0) of dimensions width and height of D 1808, d.width and d.height respectively, and executes step 1824.

Step 1824 of paintVertical method 930 adds first side 3-D effect 350 and executes step 1826. Step 1826 draws first side 3-D effect 350 by a three step process which draws lines representing edges of each folder. The first step sets numberToGo 1814 to numberOfTabs 1018 less one, and sets integer counter i to zero. The second step of step 1826 sets startOffSet 1812 equal to product of numberToGo 1814 and two, sets color to lightGray and draws a line starting at point (D.width 1808 less tabSize 1026 less startOffSet 1812, product of 25 and sum of i plus one) and ending at point (D.width 1808 less tabSize 1026 less startOffSet 1812, D.Height 1808) and sets color to black and draws a line starting at point (D.width 1808 less tabSize 1026 less startOffSet 1812 plus one, product of 25 and sum of i plus one) ending at point (D.width 1808 less tabSize 1026 less startOffSet 1812). This step adds a 3D effect of folder depth. The starting point of which is at the end of the previous tab. The black line is the same as the gray line, since the gray line is a shadow of the black line. The third step of 1826 decrements numberToGo 1814, increments counter i, checks if i is less than numberOfTabs 1018, and if so then executes second step of 1826, and if not then executes step 1827.

Step 1827 of paintVertical method 930 paints all tabs 342 except selected tab 310 by executing steps 1828 through 1840. Step 1828 sets numberToGo 1814 equal to numberOfTabs 1018 less one, sets startTab 1810 equal to D.width 1808 less tabSize 1026 less ten, initializes integer counter i to zero, and executes step 1829. Step 1829 checks if i is less then numberOfTabs 1018 and if so then executes step 1830, and if not then executes step 1842. Step 1830 sets startOffSet 1812 equal to product of two and numberToGo 1814, checks that i is not equal to currentTab 1006, and if so then executes step 1831, and if not then increments i and executes step 1829. Step 1831 paints nonselected tabs 342. Step 1831 paints tabs by executing step 1832. Step 1832 sets color to tabColor 1040 of element at (i plus pageOffSet 1020) and draws a filled rounded rectangle starting at point (startTab 1810 less startOffSet 1812, product of i and 25) of width tabSize 1026, height 25, arc width 25, and arc height 25, and then executes step 1834. Step 1834 outlines nonselected tabs 342 by executing step 1836. Step 1836 sets color to black and draws rounded rectangle starting at point (startTab 1810 less startOffSet 1812, product of 25 and i ) of width tabSize 1026, height 25, arc width 25 and arc height 25, and executes step 1838. Step 1838 adds tab text to nonselected tabs 342 by executing step 1840. Step 1840 sets color to tabTextColor 1042 element at position sum of i and pageOffSet 1020, and draws nonselected text string of tabtext 1044 element at position (sum of i and pageOffSet 1020, sum of startTab 1810 and 15 less startOffSet 1812, the sum of 25 and the product of currentTab 1006 and 25 (this product is the width of the tab)), decrements numberToGo 1814, increments i, and executes step 1829.

Step 1842 of paintVertical method 930 paints selected tab 310. Step 1842 sets startOffSet 1812 equal to product of two and numberOfTabs 1018 and executes steps 1844 through 1860. Step 1844 outlines selected tab which executes step 1846. Step 1846 sets color to black and draws a rounded rectangle at point (startTab 1810 less startOffset 1812, product of 25 and currentTab 1006) of width tabSize 1026, height 25, arc width 25 and arc height 25, and executes step 1848. Step 1848 draws the background by executing step 1850. Step 1850 sets color to tabColor 1040 of element at sum of currentTab 1006 and pageOffSet 1020. Step 1850 then draws a filled rectangle starting at point (0, 0) of width D.width 1808 less tabSize 1026 less startOffSet 1812 plus one and height of D.height 1808, and executes step 1852. Step 1852 sets color to black and draws a rectangle to outline the background starting at point (0, 0) of width D.width 1808 less tabSize 1026 less startOffSet 1812 less one, and height D.height 1808, and executes step 1854. Step 1854 paints selected tab 310 by executing step 1856. Step 1856 sets color to tabColor 1040 of element at sum of currentTab 1006 and pageOffSet 1020, and draws a filled rounded rectangle at point (startTab 1810 less startOffSet 1812, one plus product of currentTab 1006 and 25) of width tabSize 1026, height 25 less one, arc width 25 and arc height 25, and executes step 1858. Step 1858 adds tab text to selected tab 310 by executing step 1860. Step 1860 sets color to tabTextColor 1042 element at sum of currentTab 1006 draws text string tabText 1044 of element at sum of currentTab 1006 and pageOffSet 1020, at point (startTab 1810 plus the product of i and 2 (this product is the offset for the 3D effect) plus 7, the product of i and 25 (this product is the tab location) plus 15 (the offset into the tab)), and executes step 1862.

Step 1862 of paintVertical method 930 adds second side 3-D effect 352 by executing steps 1864 through 1871. Step 1864 paints second side holes 254. Step 1864 paints increasingly dark filled concentric rectangles in decreasing size to give hole effect, initializes integer counter i set to eight, checks if i is less than D.height 1808 less 17, if so then executes step 1865 and if not then executes step 1892. Step 1865 sets color to lightGray and draws a filled rectangle at point (15, i ), of width 10 and height 10, and executes step 1866. Step 1866 sets color to gray and draws filled rectangle at point (16, i) of width 9 and height 9, and executes step 1867. Step 1867 sets color to black and draws filled rectangle at point (17, i ) of width 8 and height 8, increments counter i by 17 and checks if i is less than D.width 1808 less 17, if so then executes step 1865, if not then executes step 1892.

Step 1892 paints second side border lines by executing steps 1894 through 1897. Step 1894 sets color to lightGray and draws a filled rectangle at point (0,0) of width six and height D.height 1808, and executes step 1895. Step 1895 sets color to black and draws a filled rectangle at point (six, 0) of width two and height D.height 1808, and executes step 1896. Step 1896 sets color to gray and draws a filled rectangle at point (seven, 0) of width two and height D.height 1808, and executes step 1897. Step 1897 sets color to lightGray and draws a filled rectangle at point (eight, 0) of width two and height D.height 1808, and executes step 1868.

Step 1868 paints second side wires 356. Step 1868 initializes integer counter i set to eight, and executes steps 1869 through 1871 which draw multiple colored concentric arcs of decreasing radii. Step 1869 sets color to lightGray and draws an arc at point (three, i ) of width 15, height 15, start angle 30 and arc angle 200, and executes step 1870. Step 1870 sets color to gray and draws an arc at point (four, i ) of width 15, height 15, start angle 30 and arc angle 200, and executes step 1871. Step 1871 which sets color to black and draws an arc at point (five, i ) of width 15, height 15, start angle 30 and arc angle 200, and increments counter i by 17 checks if i is less than D.height 1808 less 17, if so then executes step 1869, and if not then executes step 1872.

Step 1872 of paintVertical method 930 checks if arrow flags are needed by executing steps 1873 through 1888. Step 1872 checks if scroll Down folder selection arrow 338 is needed by checking if pageOffSet 1020 is greater than zero, and if so then executes steps 1873 through 1875 to draw three different colored scroll down folder selection arrows; and if not then executes step 1876. Step 1873 sets color to black and calls buildDownArrow method 914 to draw at point (D.width 1808 less tabSize 1026 less 45 less product of numberOfTabs 1018 and two, five) a filled eight sided polygon described by vectors downArrowX 1010 and downArrowY 1012 of width 20 and height 25, and executes step 1874. Step 1874 sets color to gray and calls build- DownArrow method 914 to draw at point (D.width 1808 less tabSize 1026 less 46 less product of 2 and numberOfTabs 1018, five ) a filled eight sided polygon described by vectors downArrowX 1010 and downArrowY 1012 of width 20 and height 25, and executes step 1875. Step 1875 sets color to white and calls buildDownArrow method 914 to draw at point (D.width 1808 less tabSize 1026 less 47 less the product of 2 and numberOfTabs 1018 ) a filled eight sided polygon described by vectors downArrowX 1010 and downArrowY 1012 of width 20 and height 25, and executes step 1876.

Step 1876 checks whether a scroll up folder selection arrow 334 is needed, by checking if pageOffSet 1020 plus maxNumberOfTabs 1014 is less than numberOfPages 1016, and if not then executes step 1886; and if so then sets color to black and calls buildUpArrow method 918 to draw at point (D.width 1808 less tabSize 1026 less 26 less product of 2 and numberOfTabs 1018, five) a filled eight sided polygon described by vectors upArrowX 1028 and UpArrowY 1030 of width 20 and height 25 which draws a scroll up folder selection arrow 334, and executes step 1877. Step 1877 sets color to gray and calls buildUpArrow method 918 to draw at point (D.width 1808 less tabSize 1026 less 27 less product of 2 and numberOfTabs 1018, five ) a filled eight sided polygon described by vectors upArrowX 1028 and upArrowY 1030 of width 20 and height 25, and executes step 1878. Step 1878 sets color to white and calls buildUpArrow method 918 to draw at point (D.width 1808 less tabSize 1026 less 28 less product of 2 and numberOfTabs 1018, five ) a filled eight sided polygon described by vectors upArrowX 1028 and upArrowY 1030 of width 20 and height 25 and executes step 1886.

Step 1886 of paintVertical method 930 adds a page count if necessary. Step 1886 initializes vector tempV, sets tempV equal to vector folders 1036 element at the position of sum of currentTab 1006 and pageOffSet 1020. Step 1886 also checks if the size of tempV is greater than one, if so then it executes step 1888, if not then it executes step 1890. Step 1888 sets color to black, draws string of text "page", number folderTab 1054 plus one, text "of", number size of tempV, of width D.width 1808 less ten, and executes step 1879.

Step 1879 determines if decrement page selection arrow 328 is needed (when current page is not the first page) by checking if folderTab 1054 is not equal to zero, if not so then executes step 1882; and if so then sets color to black and calls buildRightArrow method 920 to draw at point (D.width 1808 less 180 less product of numberOfTabs 1018 and two, D.height 1808 less 20) a filled eight sided polygon described by vectors rightArrowX 1022 and rightArrowY 1024 of width 30 and height 21, and executes step 1880.

Step 1880 sets color to gray and calls buildRightArrow method 920 which draws at point (D.width 1808 less 179 less product of numberOffabs 1018 and two, D.height 1808 less 21) a filled eight sided polygon described by vectors rightArrowX 1022 and rightArrowY 1024 of width 30 and height 21, and executes step 1881. Step 1881 sets color to white and calls buildRightArrow method 920 to draw at point (D.width 1808 less 178 less product of numberOfTabs 1018 and two, D.height 1808 less 22) a filled eight sided polygon described by vectors rightArrowX 1022 and righArrowY 1024 of width 30 and height 21, and executes step 1882.

Step 1882 checks whether advance page selection arrow 324 is needed (if folderTab 1054 is not the last page) by checking if folderTab 1054 is not equal to (size of tempV) less one, and if not then executes step 1890; and if so then sets color to black and calls buildLeftArrow method 916 to draw at point (D.width 1808 less 150 less product of numberOfTabs 1018 and two, D.height 1808 less 20) a filled eight sided polygon described by vectors leftArrowX 1056 and leftArrowY 1058 of width 30 and height 21 and executes step 1883.

Step 1883 sets color to gray and calls buildLeftArrow method 916 to draw at point (D.width 1808 less 151 less product of numberOfTabs 1018 and two, D.height 1808 less 21) a filled eight sided polygon described by vectors leftArrowX 1056 and leftArrowY 1058 of width 30 and height 21, and executes step 1884.

Step 1884 sets color to white and calls buildLeftArrow method 916 to draw at point (D.width 1808 less 152 less product of numberOfTabs 1018 and two, D.height 1808 less 22) a filled eight sided polygon described by vectors leftArrowX 1056 and leftArrowY 1058 of width 30 and height 21, and executes step 1890. Step 1890 represents the end of execution of paintVertical method 930.

Figure 19:
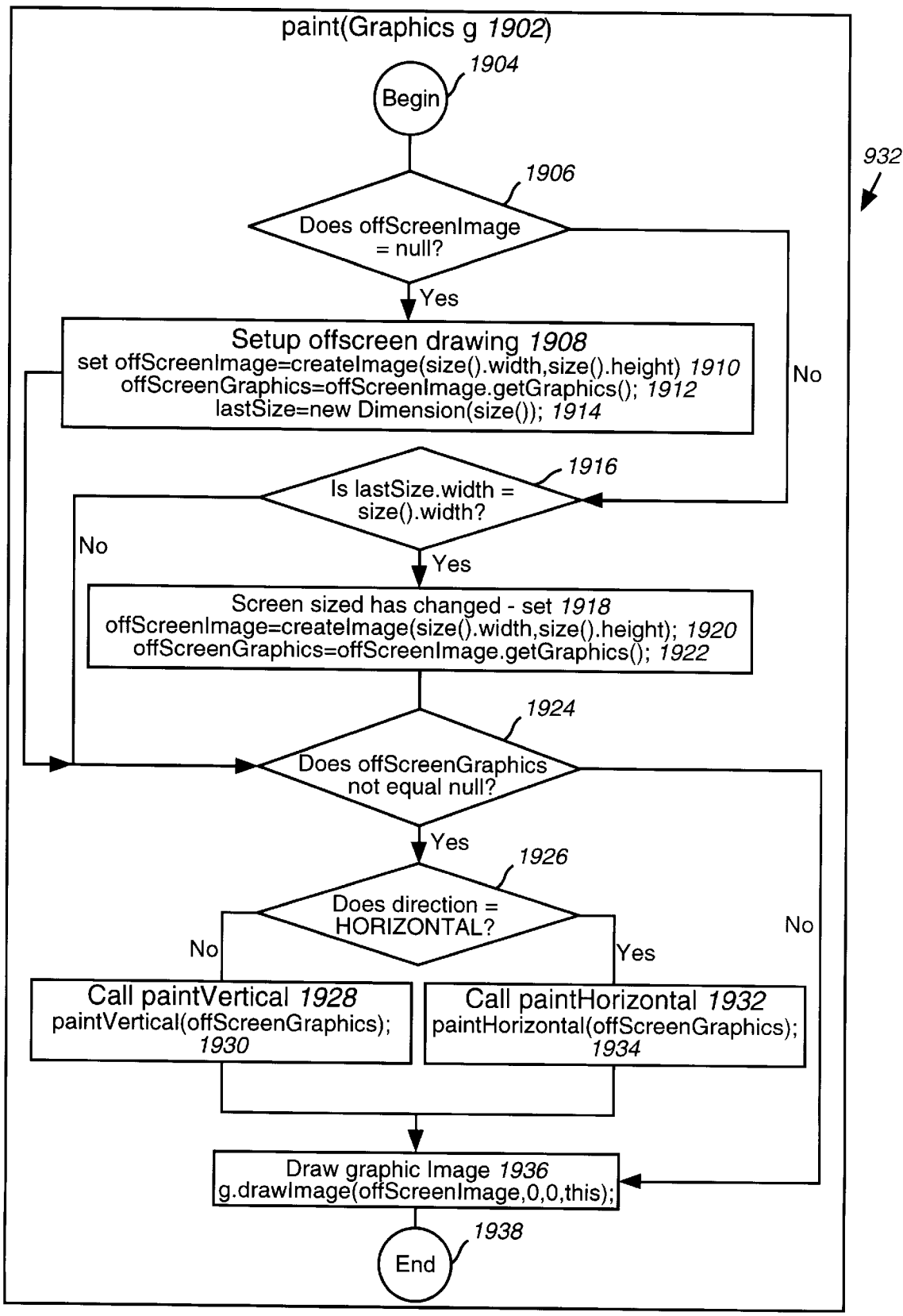
FIG. 19 is a flow diagram of the paint method.

FIG. 19 illustrates a flow chart representing the operation of paint method 932 having paint method parameter—of type Graphics and name g 1902. Step 1904 of paint method 932 begins execution and continues immediately with step 1906. Step 1906 checks if offScreenImage 1048 equals null, and if so then executes step 1908, and if not then executes step 1916. Step 1908 sets up offscreen drawing by executing steps 1910 through 1914. Step 1910 creates offScreenImage 1048 of width size( ).width and height size( ).height, and executes 1912. Step 1912 sets offScreenGraphics 1050 equal to the graphics of offscreenImage 1048, and executes step 1914. Step 1914 sets lastSize 1052 equal to a new Dimension of size size( ), and executes step 1924. Step 1916 checks if width of lastSize is equal to width of size( ), and if so then executes step 1918, and if not then executes step 1920. Step 1918 executes steps 1920 and 1922 since screen size has changed. Step 1920 creates offScreenImage 1048 of width of size( ) and height of size( ), and executes step 1922. Step 1922 sets offScreenGraphics 1050 equal to Graphics( ) of offScreenImage, and executes step 1924. Step 1924 checks if offScreenGraphics does not equal null and if so then executes step 1926, and if not so then executes step 1936. Step 1926 checks if direction equals HORIZONTAL 1002 and if so then executes step 1932, and if not so then executes step 1928. Step 1928 calls paintHorizontal method 928 by executing step 1930. Step 1930 calls paintHorizontal on parameter offScreenGraphics 1050. Step 1932 calls paintVertical method 930 by executing step 1934, and executes step 1936. Step 1934 calls paintVertical on parameter offScreenGraphics 1050, and executes step 1936. Step 1936 draws image of offscreenImage 1048 at point (0,0), and executes step 1938 representing the completion of the method.

Application Programmer Usage

Figure 20A:
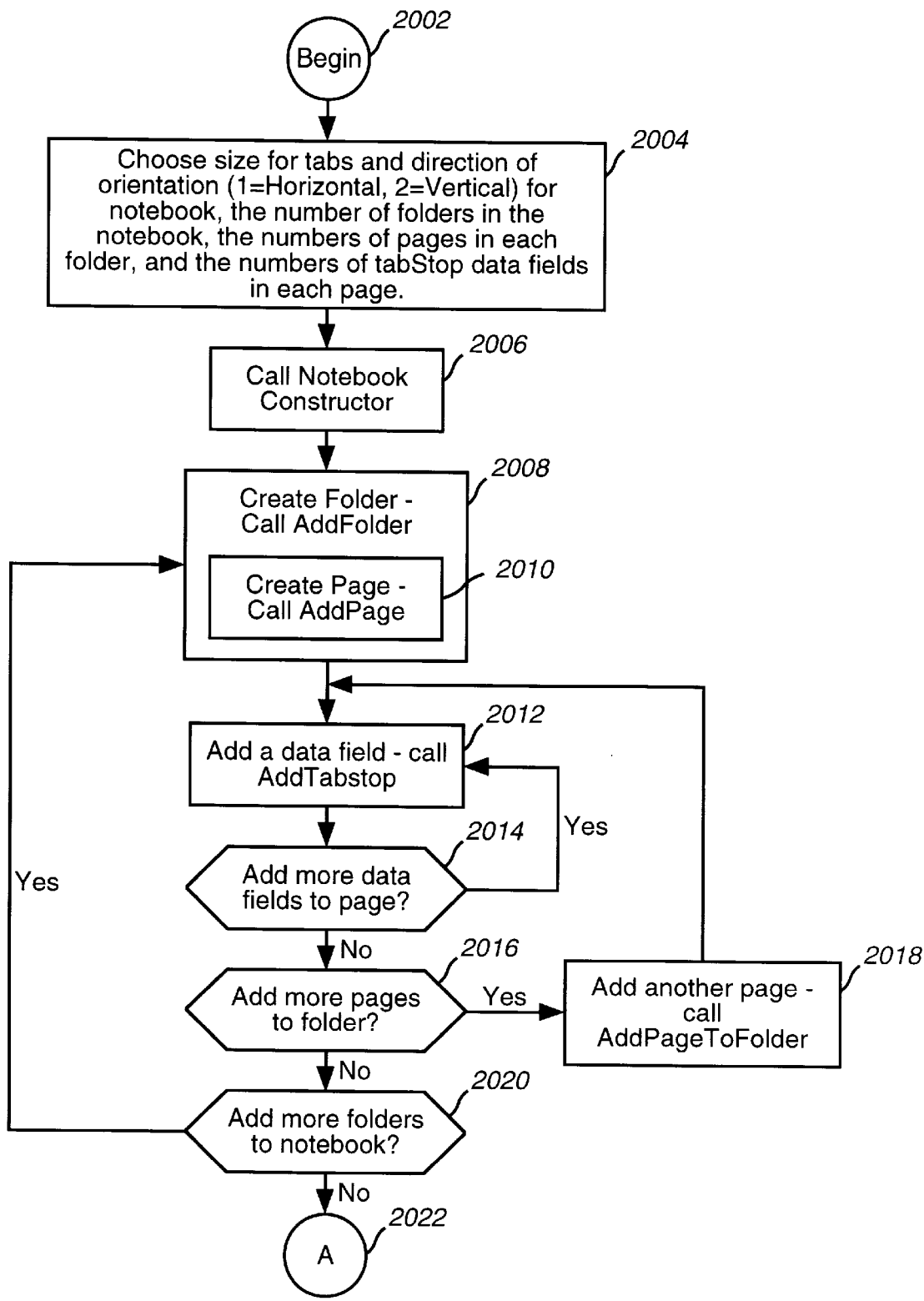
FIGS. 20a and 20b collectively depict a flow diagram illustrating use of Notebook and NotebookPage classes by a programmer in writing a program.
Figure 20B:
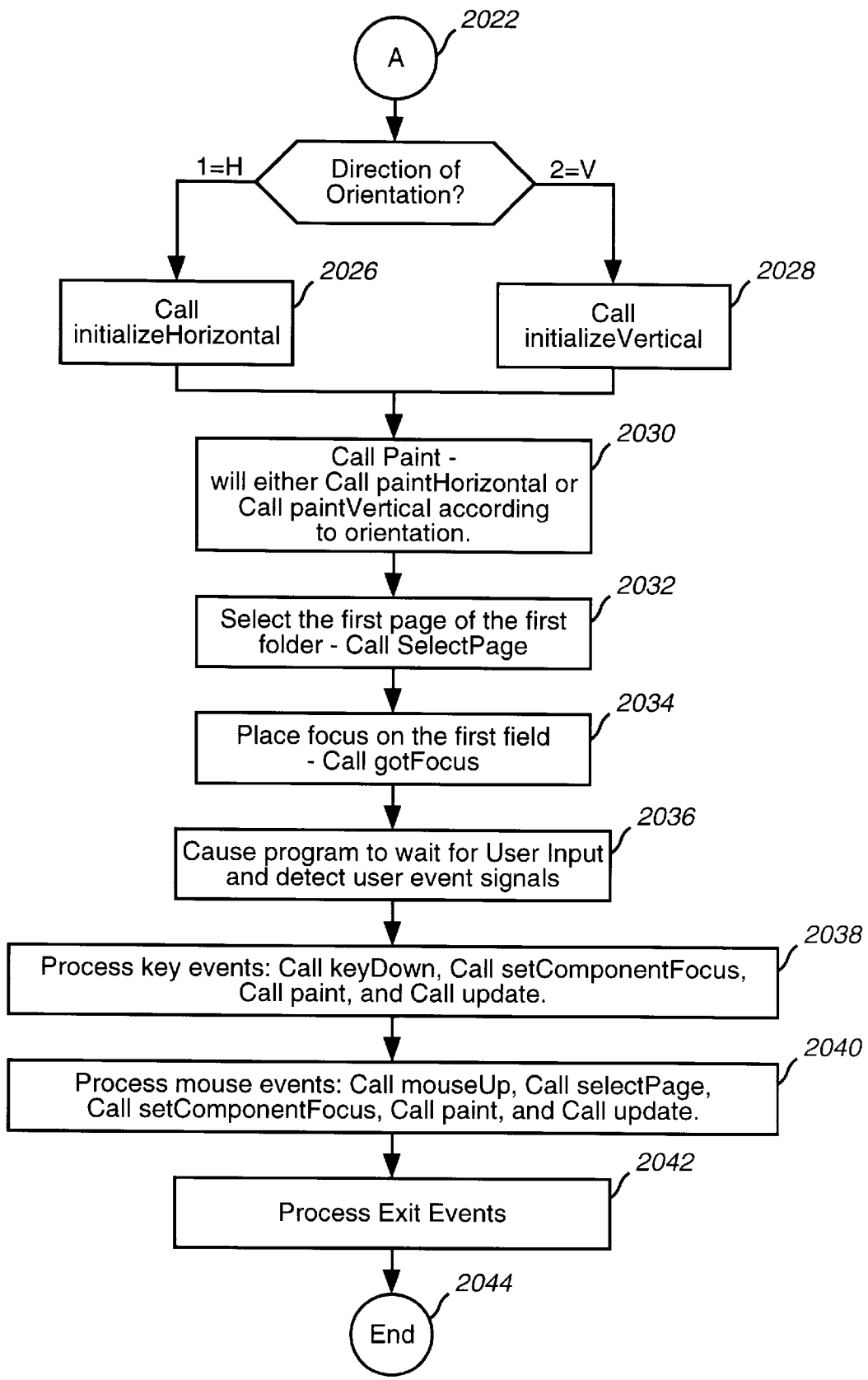

FIG. 20a and 20b collectively depict a flow chart demonstrating how an application programmer could use Notebook 902 and NotebookPage 402 classes to write a program. To write a Notebook application program, the programmer begins with step 2002 which immediately continues with step 2004. The programmer in step 2004 chooses the size of tabs tabSize 1026, direction 1008 of orientation (where value of one represents HORIZONTAL 1002, value of two represents VERTICAL 1004), the number of folders to be included in the notebook, the numbers of pages in each corresponding folder, and the number of Tabstop data fields in each corresponding page. In step 2006, the programmer inserts into the application program instruction(s) to call Notebook constructor 906 which creates a notebook. In step 2008, the programmer adds instruction(s) to call addFolder method 908 which creates a folder. In step 2010, the programmer inserts instruction(s) into the application program to create a page by calling addPage method 910. In step 2012, the programmer inserts instruction(s) into the application program to add a data field to the page by calling addTabStop method 410. In step 2014, the programmer checks if more data fields need to be added to the page depending upon the choice determined in step 2004. If the programmer determines in step 2014 that more data fields must be inserted into the page, then the programmer continues with step 2012 which inserts instructions into the program to add more data fields by calling addTabstop method 410. If the check of step 2014 determines that no more data fields should be added to the page, then the programmer continues with step 2016. In step 2016, the programmer determines whether more pages must be added to the folder depending upon the choice determined in step 2004. If the programmer determines in step 2016 that more pages must be added to the folder, then the programmer continues with step 2018. In step 2018, the programmer inserts instruction(s) to add another page to the folder (if the check determined that more pages should be added) by calling addPageToFolder method 912. After step 2018, the programmer continues with step 2012 as described above. If in step 2016, the programmer determines that no more pages need to be added to the folder, then the programmer continues with step 2020. In step 2020, the programmer determines whether more folders must be added to the notebook depending upon the choice determined in step 2004. In step 2020, if the programmer determines that more folders must be added to the notebook, then the programmer continues with step 2008, as discussed above. If in step 2020 the programmer determines that no more folders must be added to the notebook, then the programmer will continue with step 2022. Connector 2022 connects FIG. 20*a* to FIG. 20*b*.

FIG. 20*b* begins with connector 2022 which has the programmer immediately continue with step 2024. In step 2024, the programmer determines the direction 1008 of orientation which was chosen in step 2004, above. If the orientation direction 1008 chosen in step 2004 equals two, then the programmer continues with step 2028, and if the orientation direction 1008 equals one, then the programmer continues with step 2026. In step 2028 the programmer inserts into the application program instruction(s) to call initializeVertical method 924 to initialize a vertical notebook 306, and the programmer continues with step 2030. In step 2026 the programmer inserts into the application program instruction(s) to call initializeHorizontal method 922 to initialize a horizontal notebook 206, and then continues with step 2030. In step 2030 the programmer inserts into the application program instruction(s) to call paint method 932. Recall from FIG. 19 that paint method 932 calls paintHorizontal method 928 if direction 1008 equals one and calls paintVertical method 930 if direction 1008 equals two. After step 2030, the programmer continues with step 2032. In step 2032, the programmer inserts into the application program instruction(s) to select the first page of the first folder by calling selectpage method 936 which is used to programmatically select a page of a folder. After step 2032, the programmer continues with step 2034. In step 2034, the programmer inserts into the application program instruction (s) to place the focus of the cursor on the first data field by calling gotFocus method 412 which places cursor focus on the first field. After step 2034, the programmer continues with step 2036. In step 2036, the programmer inserts into the application program instruction(s) which during execution of the program wait for user input to be received and detect any user event signals. After step 2036, the programmer continues with step 2038. In step 2038, the programmer inserts instruction(s) into the program, which cause the program when executing, to process key events detected during execution of the instructions of step 2036. As part of step 2038, the programmer inserts instruction(s) into the program which call keyDown method 414 to respond to tab-key or backwards tab-key key strokes, instructions which call setComponentFocus method 418, instructions which call paint method 416, 928, and instructions which call update method 934. After step 2038, the programmer continues with step 2040. In step 2040, the programmer inserts instruction(s) into the program, which cause the program when executing to process mouse events detected during execution of the instruction(s) of step 2036. As part of step 2040, the programmer inserts instruction(s) into the program which call mouseUp method 926, instruction(s) which call selectpage method 936, instruction(s) which call setComponentFocus method 418, instruction(s) which call paint method 416, 928, and instructions which call update method 934. After step 2040, the programmer continues with step 2042. In step 2042, the programmer inserts instruction(s) which during execution of the program will process as a result of detection of an exit event detected during execution of the instruction(s) of step 2036. In step 2042, the programmer inserts instruction(s) into the program which process any exit events which would be detected during execution. After completion of step 2042, the programmer continues with step 2044, which completes the use of the present invention by the application programmer. In steps 2038, 2040, when the programmer inserts into the application program instruction(s) to call update method 934, the programmer does so, in order to overload the update function to avoid flicker.

Operational Workflow

Figure 21:
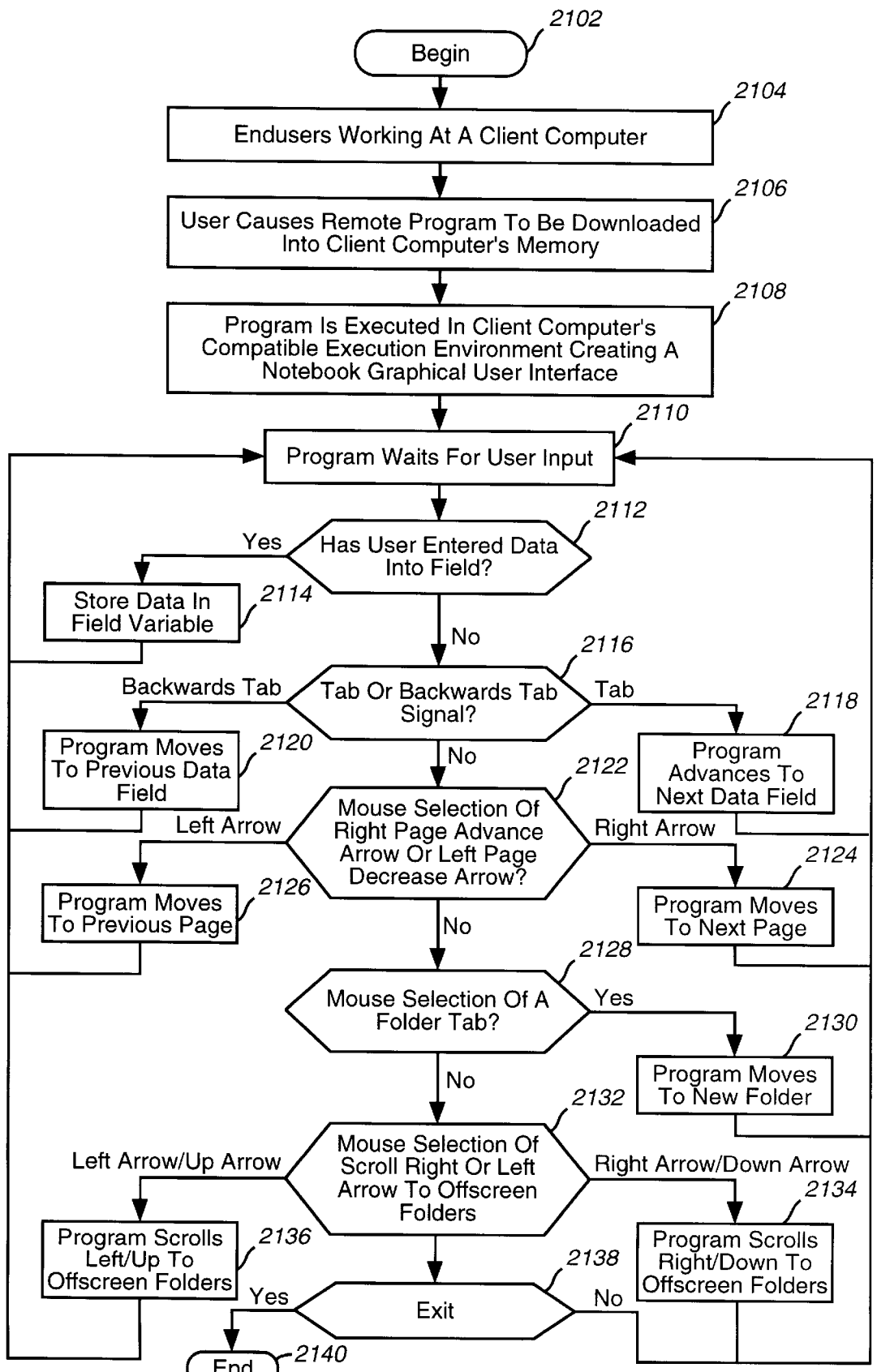
FIG. 21 is a flow diagram illustrating an end user's operational workflow.

FIG. 21 illustrates a flow diagram of end user operational workflow 2102 which demonstrates how an end user 104 would operationally interact with a notebook control program. End user operational workflow 2102 begins with step 2103 which immediately continues with step 2104. In step 2104, the end user 104 begins working at client computer 106. In step 2106, the end user 104 causes remote program 110 to be downloaded into the memory 116 of client computer 106. In step 2108, end user causes remote program 110 to be executed in a Java compatible execution environment 304 or Java compatible browser 204 on client computer 106 thereby creating a notebook graphical user interface 206 or 306. In step 2110, the the remote program 110 waits for end user 104 to initiate an input event. In step 2110, when end user 104 initiates an event, end user causes step 2112 to be performed. In step 2112 the program performs several instruction(s) which check if end user 104 entered data into a data field. In step 2112, if the end user 104 did enter data into a data field, then the program performs step 2114. If the end user 104 did not enter data into a data field then the program continues with step 2116. In step 2114, the program performs several instruction(s) which store the data in a data field variable tabSelection 1046 and go back to step 2110 (in step 2110 the program waits for further input from the end user 104). In step 2116 the program performs several instruction(s) which check if a tab-key or backwards tab-key have been pressed and if a tab-key has been pressed then performs step 2118 and if a backwards tab-key has been pressed then performs step 2120. In step 2118, the program performs several instruction(s) which set the focus of the program to the next data field 218 or 318 or wraps to first data field 218 or 318 and then executes step 2110 which waits for further input from the end user. In step 2120 the program sets the focus of the cursor to the previous data field 218 or 318 or wraps to last data field 218 or 318 and executes step 2110 which waits for further input. In step 2122 the program checks if mouse 126 selection of page advance arrow 224 or 324 or page decrement arrow 228 or 328 has been pressed by the end user and if not then the program performs step 2128. If in step 2122 page advance arrow 224 or 324 has been selected, then the program performs step 2124. In step 2124, the program changes to next page 216 or 316 of current folder 208 or 308 of notebook 206 or 306 and the program performs step 2110. If in step 2122 page decrement arrow 228 or 328 has been selected by the end user, then the program performs step 2126. In step 2126 the program changes to previous page 228 or 328 of current folder 208 or 308 of notebook 206 or 306 and the program performss step 2110. In step 2128 the program checks if mouse 126 selection of a folder tab 242 or 342 and if so then performs step 2130 and if not then performs step 2132. Step 2130 changes to a different folder 208 or 308 of notebook 206 or 306 and performs step 2110. In step 2132 the program checks if mouse 126 selection of scroll left 234, scroll right 238, scroll up 334 or scroll down 338 arrows to offscreen folders has occurred, and if none have occurred then performs step 2138. If in step 2132 a scroll right arrow 238 or a scroll down arrow 338 occurred then step 2134 is executed which scrolls right or down to offscreen folders, respectively and performs step 2110. If in step 2132 a scroll left arrow 234 or a scroll up arrow 334 occurred then step 2136 is executed which scrolls left or up to offscreen folders, respectively and performs step 2110. In step 2138 checks if an Exit request has been selected and if not so then performs step 2110, and if so then performs step 2140 which immediately ends notebook program execution.

Class Hierarchy

FIG. 22 represents the class hierarchy 2202 for the NotebookPage class 402 and Notebook class 902. The Object class 2204 is the basic element or root class of the Java object oriented programming language. Thus, all classes are subclasses of the Object class 2204. The Component class 2206 includes responsibility for managing keyboard and mouse input, focus management and graphical user interface components, such as buttons, menus, lists, and dialog boxes. The Container class 2208 includes responsibility for laying out any components it contains. The Panel class 2210 includes responsibility for laying out components it contains and is a recursively, nestable, concrete screen component. The Object, Component, and Panel classes are all well known to Java programmers. The Notebook class 902 includes responsibility for laying out a notebook. The NotebookPage class 402 includes responsibility for laying out a page in a notebook.

Both classes 402 and 902 are subclasses of Panel class 2210. The Panel class 2210 is a subclass of Container class 2208. The Container class 2208 is a subclass of Component class 2206. The Component class 2206 is a subclass of Object class 2204.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A platform independent method for maintaining an object-oriented notebook in a computer having a memory component, the method comprising the steps of:

(1) instantiating a notebook control object;

(2) adding a folder to said notebook control object;

(3) adding a notebookpage to said folder;

(4) adding a tabStop data field to said notebookPage;

(5) initializing data of said notebook control object;

(6) painting said notebook control object;

(7) setting cursor focus to said tabStop data field element; and (8) processing user events.

2. The method according to claim 1, wherein step (1) comprises the steps of:

(a) constructing said notebook control object;

(b) setting tabSize of said notebook control object;

(c) setting direction of said notebook control object;

(d) setting up constraints of said notebook control object; and (e) setting up layout according to said direction.

3. The method according to claim 1, wherein step (2) includes a step of adding a notebookPage to said notebook control object.

4. The method according to claim 1, wherein step (3) comprises the steps of:

(a) adding a new vector element to folders if size of folders equals numberOfPages;

(b) adding a newPage object by tabName;

(c) saving information about newPage for later use; and (d) incrementing the numberOfPages.

5. The method according to claim 1, wherein step (4) comprises adding an element to a tab-keySelection vector.

6. The method according to claim 1, further comprising the step of:

adding an additional tabStop data field to said notebookpage.

7. The method according to claim 1, further comprising the step of:

adding an additional notebookpage to said folder.

8. The method according to claim 1, further comprising the step of:

adding an additional folder to said notebook control object.

9. The method according to claim 1, wherein step (5) includes at least one step of the following steps:

(a) initializing data of a horizontal notebook; and (b) initializing data of a vertical notebook.

10. The method according to claim 9, wherein step (5) further comprises the steps of:

(c) calculating number of possible tabs;

(d) checking if currentTab has moved offscreen;

(e) reloading and adding invisible tabSelection rectangles;

(f) reloading and adding invisible arrowSelection rectangles for scrolling to offscreen folders if needed, including at least one of:
  adding left and right arrows for said horizontal notebook, and
  adding up and down arrows for said vertical notebook; and (g) reloading and adding invisible page selection arrows if necessary including at least one of:
  adding left pointing arrow for advancing to next page, and
  adding right pointing arrow for moving to previous page.

11. The method according to claim 1, wherein step (6) includes the steps of:
   (a) drawing offscreen said notebook control object; and
   (b) drawing image to screen all at once.

12. The method according to claim 11, wherein step (a) includes at least one step of the following steps:
   (i) painting horizontal notebook; and
   (ii) painting vertical notebook.

13. The method according to claim 12, wherein said steps (i) and (ii) include at least one step of the following set of steps:
   initializing variables;
   reinitializing data of said notebook since might be a resize;
   checking if numberOfPages is equal to zero;
   adding 3-D effect for at least one of
      top for said horizontal notebook, and
      first-side for said vertical notebook;
   painting all nonselected tabs including:
      painting said nonselected tabs,
      outlining said nonselected tabs, and
      adding said nonselected tab text;
   painting selected tab including:
      outlining said selected tab,
      drawing background of selected folder,
      painting said selected tab, and
      adding said selected tab text;
   adding 3-D effect including at least one of:
      painting bottom holes and wires for horizontal, and
      painting second side holes and wires for vertical;
   painting scroll to offscreen folder tab arrows if needed;
   adding a pagecount if more than one page; and
   adding page advance or decrement arrows if needed.

14. The method according to claim 1, wherein step (8) includes at least one step of the following set of steps:
   (a) receiving data into said tabStop data field;
   (b) receiving keyDown event selecting said tabStop data field component; and
   (c) receiving mouseUp event selecting said invisible rectangles.

15. The method according to claim 1, wherein said notebook is written in Java.

16. The method according to claim 15, wherein said notebook is an Applet.

17. A computer program product comprising a computer useable medium having computer program logic recorded thereon, said computer program logic comprising:
   an instantiating means for enabling a computer to instantiate a notebook control object;
   an adding folder means for enabling the computer to add a folder to said notebook control object;
   an adding notebookPage means for enabling the computer to add a notebookPage to said folder;
   an adding tabStop data field means for enabling the computer to add a tabStop data field element to said notebookpage;
   an initializing data means for enabling the computer to initialize said notebook control object;
   a painting means for enabling the computer to paint said notebook control object;
   a setting cursor focus means for enabling the computer to set cursor focus to said tabStop data field element; and
   a processing means for enabling the computer to process user events.

18. The computer program product according to claim 17, wherein said instantiating means comprises:
   a constructing means for enabling a computer to construct said notebook control object;
   a tabSize setting means for enabling a computer to set tabSize of said notebook control object;
   a direction setting means for enabling a computer to set direction of said notebook control object;
   a constraint setup means for enabling a computer to set up constraints of said notebook control object; and
   a layout setup means for setting up layout according to said direction.

19. The computer program product according to claim 17, wherein said adding folder means includes an adding notebookPage means for enabling a computer to add a notebookPage to said notebook control object.

20. The computer program product according to claim 17, wherein said adding notebookpage means comprises:
   an adding vector means for enabling a computer to add a new vector element to folders if size of folders equals numberOfPages;
   an adding newPage means for enabling a computer to add a newPage object by tabName;
   a saving information means for enabling a computer to save information about newpage for later use; and
   an incrementing numberOfPages means for enabling a computer to increment the numberOfPages.

21. The computer program product according to claim 17, wherein said adding a tabStop data field means comprises an adding tab-keySelection vector element means for enabling a computer to add an element to a tab-keySelection vector.

22. The computer program product according to claim 17, further comprising:
   an adding an additional tabStop data field means for enabling a computer to add an additional tabStop data field to said notebookPage.

23. The computer program product according to claim 17, further comprising:
   an adding an additional notebookPage means for enabling a computer to add an additional notebookPage to said folder.

24. The computer program product according to claim 17, further comprising:
   an adding an additional folder means for enabling a computer to add an additional folder to said notebook control object.

25. The computer program product according to claim 17, wherein said initializing data means includes at least one of the following:
   an initializing horizontal data means for enabling a computer to initialize data of a horizontal notebook, and
   an initializing vertical data means for enabling a computer to initialize data of a vertical notebook.

26. The computer program product according to claim 25, wherein said initializing data means further comprises the steps of:
   a calculating means for enabling a computer to calculate number of possible tabs;
   a checking offscreen tab means for enabling a computer to check if currentTab has moved offscreen;
   an adding invisible tabSelection rectangles means for enabling a computer to reload and add invisible tabSelection rectangles;
   an adding invisible arrowSelection rectangles means for enabling a computer to reload and add invisible arrowSelection rectangles for scrolling to offscreen folders if needed, including at least one of:
an adding horizontal arrows means for enabling a computer to add left and right arrows for said horizontal notebook, and
an adding vertical arrows means for enabling a computer to add up and down arrows for said vertical notebook; and
an adding invisible page selection arrows means for enabling a computer to reload and add invisible page selection arrows if necessary including at least one of:
an adding page advance arrow means for enabling a computer to add left pointing arrow for advancing to next page, and
an adding page decrement arrow means for enabling a computer to add right pointing arrow for moving to previous page.

27. The computer program product according to claim 17, wherein said painting means includes:
an offscreen drawing means for enabling a computer to draw offscreen said notebook control object; and
an image drawing means for enabling a computer to draw image to screen all at once.

28. The computer program product according to claim 27, wherein said offscreen drawing means includes at least one of:
a painting horizontal means for enabling a computer to paint horizontal notebook, and
a painting vertical means for enabling a computer to paint vertical notebook.

29. The computer program product according to claim 28, wherein said painting horizontal and vertical means include at least one of:
a variable initializing means for enabling a computer to initialize variables;
a reinitializing for resize means for enabling a computer to reinitialize data of said notebook since might be a resize;
a checking for zero pages means for enabling a computer to check if numberOfPages is equal to zero;
an adding 3-D effect means for enabling a computer to add 3-D effect for at least one of
a painting top means for enabling a computer to paint top of said horizontal notebook, and
a painting first-side means for enabling a computer to paint first-side of said vertical notebook;
a painting all nonselected tabs means for enabling a computer to paint all nonselected tabs including:
a painting nonselected tab means for enabling a computer to paint said nonselected tabs,
an outlining nonselected tab means for enabling a computer to outline said nonselected tabs, and
an adding nonselected tab text means for enabling a computer to add said nonselected tab text;
a painting selected tab means for enabling a computer to paint selected tab including:
an outlining selected tab means for enabling a computer to outline said selected tab,
a drawing background means for enabling a computer to draw background of selected folder,
a painting selected tab means for enabling a computer to paint said selected tab, and
an adding selected tab text means for enabling a computer to add said selected tab text;
an adding 3-D holes and wires effect means for enabling a computer to add 3-D effect including at least one of:
a painting horizontal holes and wires means for enabling a computer to paint bottom holes and wires for horizontal, and
a painting vertical holes and wires means for enabling a computer to paint second side holes and wires for vertical;
a painting offscreen arrow means for enabling a computer to paint scroll to offscreen folder tab arrows if needed;
an adding pagecount means for enabling a computer to add a pagecount if more than one page; and
an adding page arrow means for enabling a computer to add a page advance or a decrement arrow(s) if needed.

30. The computer program product according to claim 17, wherein said event processing means includes at least one of the following:
a data receiving means for enabling a computer to receive data into said tabStop data field;
a keyDown event receiving means for enabling a computer to receive tab and backwards tabkey keyDown events for enabling a computer to cycle through and select said tabStop data field components; and
a mouseUp receiving means for enabling a computer to receive mouseUp events selecting said invisible rectangles.

31. The computer program product according to claim 17, wherein said computer program logic is written in Java.

32. The computer program product according to claim 31, wherein said computer program logic is an Applet.

33. A notebook control, comprising:
an applet written in Java;
a folder including a tab disposed on said applet;
a notebookPage disposed on said folder;
a tabStop data field disposed on said page;
a page advance arrow and page decrement arrow and a page count disposed on said applet; and
a scroll to offscreen folder arrows disposed on said applet.

34. A computer program product having a computer useable medium, and computer program logic stored in said computer usable medium, said computer program logic comprising an object oriented code library comprising computer program logic implementing an object-oriented class library, wherein object-oriented statements defined by the object-oriented class library are insertable into an object-oriented application to enable the object-oriented application to access in an object-oriented manner object-oriented class library services during run-time execution of the object-oriented application in the computer, said object-oriented class library comprising variables and methods that when executed in a computer enable the computer to create an object-oriented notebook application, and wherein said methods comprise at least one of the following:
first commands that when executed instantiate a notebook control object;
second commands that when executed add a folder;
third commands that when executed add a notebookPage;
fourth commands that when executed add a tabStop data field to said notebookPage;
fifth commands that when executed initialize data of said notebook control object;
sixth commands that when executed paint said notebook control object;
seventh commands that when executed set cursor focus to said tabStop data field element; and
eighth commands that when executed process user events.

35. A platform independent method for maintaining an object-oriented notebook in a computer having a memory component, the method comprising the steps of inserting into a program:

(1) first commands that when executed instantiate a notebook control object;

(2) second commands that when executed add a folder;

(3) third commands that when executed add a notebookPage;

(4) fourth commands that when executed add a tabStop data field to said notebookpage;

(5) fifth commands that when executed initialize data of said notebook control object;

(6) sixth commands that when executed paint said notebook control object;

(7) seventh commands that when executed set cursor focus to said tabStop data field element; and (8) eighth commands that when executed process user events.

* * * * *